United States Patent
Han et al.

(10) Patent No.: US 12,045,535 B2
(45) Date of Patent: Jul. 23, 2024

(54) EXPANDABLE DISPLAY CONTROL METHOD AND ELECTRONIC DEVICE SUPPORTING SAME

(71) Applicant: Samsung Electronics Co., Ltd., Suwon-si (KR)

(72) Inventors: Jonghyun Han, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/310,827

(22) Filed: May 2, 2023

(65) Prior Publication Data
US 2023/0273762 A1    Aug. 31, 2023

Related U.S. Application Data

(63) Continuation of application No. PCT/KR2021/016684, filed on Nov. 16, 2021.

(30) Foreign Application Priority Data

Nov. 17, 2020  (KR) .................. 10-2020-0153897

(51) Int. Cl.
  *G06F 3/048*  (2013.01)
  *G06F 3/0481*  (2022.01)
  (Continued)

(52) U.S. Cl.
  CPC .......... *G06F 3/1454* (2013.01); *G06F 3/0481* (2013.01); *G06F 3/0484* (2013.01); *G06F 3/147* (2013.01); *G06F 2203/04803* (2013.01)

(58) Field of Classification Search
  CPC ..... G06F 3/1454; G06F 3/0481; G06F 3/0484; G06F 3/147; G06F 2203/04803
  (Continued)

(56) References Cited

U.S. PATENT DOCUMENTS 9,788,042 B2    10/2017  Ro et al.
10,019,052 B2    7/2018  Lee et al.
(Continued)

FOREIGN PATENT DOCUMENTS

JP        5201599 B2 *  6/2013
KR    10-1661526 B1    10/2016
(Continued)

OTHER PUBLICATIONS

International Search Report dated Mar. 8, 2022, issued in International Patent Application No. PCT/KR2021/016684.

*Primary Examiner* — Rashawn N Tillery
(74) *Attorney, Agent, or Firm* — Jefferson IP Law, LLP

(57) ABSTRACT

An electronic device is provided. The electronic device is configured to determine whether the electronic device is connected to an external electronic device, determine whether the electronic device is switched from a first state to a second state while a first screen image according to execution of a first application is being displayed on a first display area, and display, on a second display area, a second screen image related to a function executable by the external electronic device and a function of the first application, based on whether the electronic device is connected to the external electronic device and whether the electronic device is switched from the first state to the second state.

16 Claims, 24 Drawing Sheets

(51) Int. Cl.
  *G06F 3/0484* (2022.01)
  *G06F 3/14* (2006.01)
  *G06F 3/147* (2006.01)

(58) Field of Classification Search
  CPC ....... G06F 3/04817; G06F 2203/04806; G06F 1/1677; G06F 1/1624; G06F 1/16; G06F 1/1652; G06F 3/04845; G06F 3/04886; G06F 3/14; G06F 3/1423; G06F 3/16; G06F 1/1698; G06F 3/1431; G09G 5/14
  See application file for complete search history.

(56) References Cited

U.S. PATENT DOCUMENTS

| | | | | |
|---|---|---|---|---|
| 10,191,619 | B2* | 1/2019 | Yoon | G06F 3/0482 |
| 10,203,863 | B2 | 2/2019 | Kwon et al. | |
| 10,528,078 | B2 | 1/2020 | Park et al. | |
| 10,534,534 | B2 | 1/2020 | Cheong et al. | |
| 10,911,586 | B2 | 2/2021 | Kim et al. | |
| 11,693,558 | B2* | 7/2023 | Noh | G06F 1/1643 |
| | | | | 715/788 |
| 11,815,958 | B2* | 11/2023 | Ahn | G06F 3/0482 |
| 11,928,997 | B2* | 3/2024 | Chung | G06F 3/0484 |
| 11,935,445 | B2* | 3/2024 | Min | G06F 1/1641 |
| 2013/0265221 | A1* | 10/2013 | Lee | H04N 21/4222 |
| | | | | 345/156 |
| 2015/0020013 | A1 | 1/2015 | Kim et al. | |
| 2016/0349971 | A1* | 12/2016 | Chi | G09G 5/373 |
| 2016/0378270 | A1* | 12/2016 | Lee | G06F 3/0481 |
| | | | | 715/788 |
| 2019/0261519 | A1* | 8/2019 | Park | G06F 1/1677 |
| 2019/0346954 | A1 | 11/2019 | Jung et al. | |
| 2020/0076940 | A1 | 3/2020 | Kim et al. | |
| 2023/0221841 | A1* | 7/2023 | Yang | G06F 3/04886 |
| | | | | 715/788 |
| 2023/0259217 | A1* | 8/2023 | Lee | G06F 3/1423 |

FOREIGN PATENT DOCUMENTS

| | | |
|---|---|---|
| KR | 10-2016-0149489 A | 12/2016 |
| KR | 10-2017-0000553 A | 1/2017 |
| KR | 10-2017-0090295 A | 8/2017 |
| KR | 10-2017-0115863 A | 10/2017 |
| KR | 10-2018-0015533 A | 2/2018 |
| KR | 10-2064952 B1 | 1/2020 |
| KR | 10-2020-0060322 A | 5/2020 |
| WO | WO-2017179872 A1 * 10/2017 ........... G06F 1/1626 |

* cited by examiner

EXPANDABLE DISPLAY CONTROL METHOD AND ELECTRONIC DEVICE SUPPORTING SAME

CROSS-REFERENCE TO RELATED APPLICATION(S)

This application is a continuation application, claiming priority under § 365(c), of an International application No. PCT/KR2021/016684, filed on Nov. 16, 2021, which is based on and claims the benefit of a Korean patent application number 10-2020-0153897, filed on Nov. 17, 2020, in the Korean Intellectual Property Office, the disclosure of which is incorporated by reference herein in its entirety.

BACKGROUND

1. Field

The disclosure relates to an expandable display control method and an electronic device supporting the same.

2. Description of Related Art

An electronic device having an expandable display may switch a display region to a first state (for example, reduced state) or a second state (for example, expanded stated) according to whether the display is expanded or not. For example, a slidable electronic device or a foldable electronic device may display a screen in a first display region, based on the first state, or may display a screen in the first display region and in a second display region expanded from the first display region, based on the second state.

The above information is presented as background information only to assist with an understanding of the disclosure. No determination has been made, and no assertion is made, as to whether any of the above might be applicable as prior art with regard to the disclosure.

SUMMARY

An electronic device having an expandable display may display a screen in the first display region and in the second display region, based on a designated setup or a user input, when the display region is switched from the first state to the second state. For example, when switching from the first state to the second state while displaying a first screen in the first display region in the first state, the electronic device having an expandable display may display an expanded first screen in the first display region and in the second display region, based on a setup for expanding the screen. As another example, when switching from the first state to the second state, the electronic device having an expandable display may display split screens in the first display region and in the second display region, based on a user input for splitting the screen.

However, when the display region is switched from the first state to the second state, the electronic device having an expandable display can only display a screen expanded from a first size to a second size according to the designated setup, or display split screens, based on the user input.

Aspects of the disclosure are to address at least the above-mentioned problems and/or disadvantages and to provide at least the advantages described below. Accordingly, an aspect of the disclosure is to provide an expandable display control method and an electronic device supporting the same, wherein split screens are displayed in a first display region and in a second display region as a result of predicting the user's intent, based on whether the display is expanded or not and whether the electronic device is connected to an external electronic device or not.

Additional aspects will be set forth in part in the description which follows and, in part, will be apparent from the description, or may be learned by practice of the presented embodiments.

In accordance with an aspect of the disclosure, an electronic device is provided. The electronic device includes a display configured to display a screen, based on a first state in which a screen is displayed in a first display region or a second state in which a screen is displayed in the first display region and in a second display region expanded from the first display region, a communication circuit, and a processor electrically connected to the display and the communication circuit, wherein the processor is configured to identify whether or not connection to an external electronic device exists through the communication circuit, identify whether or not a transition occurs from the first state to the second state while a first screen is displayed in the first display region as a result of execution of a first application, and display a second screen related to a function that can be performed in the external electronic device and a function of the first application in the second display region, based on whether or not connection to the external electronic device exists, and based on whether or not a transition occurs from the first state to the second state.

In accordance with another aspect of the disclosure, a method for controlling an expandable display is provided. The method includes identifying whether or not connection to an external electronic device exists through a communication circuit, identifying, while a first screen is displayed in a first display region of a display as a result of execution of a first application, whether or not a transition occurs from a first state in which a screen is displayed in a first display region to a second state in which a screen is displayed in the first display region and in a second display region expanded from the first display region, and displaying a second screen related to a function that can be performed in the external electronic device and a function of the first application in the second display region, based on whether or not connection to the external electronic device exists, and based on whether or not a transition occurs from the first state to the second state.

According to various embodiments disclosed herein, an expandable display control method and an electronic device supporting the same may display split screens in a first display region and in a second display region as a result of predicting the user's intent, based on whether the display is expanded or not and whether the electronic device is connected to an external electronic device or not.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings. is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
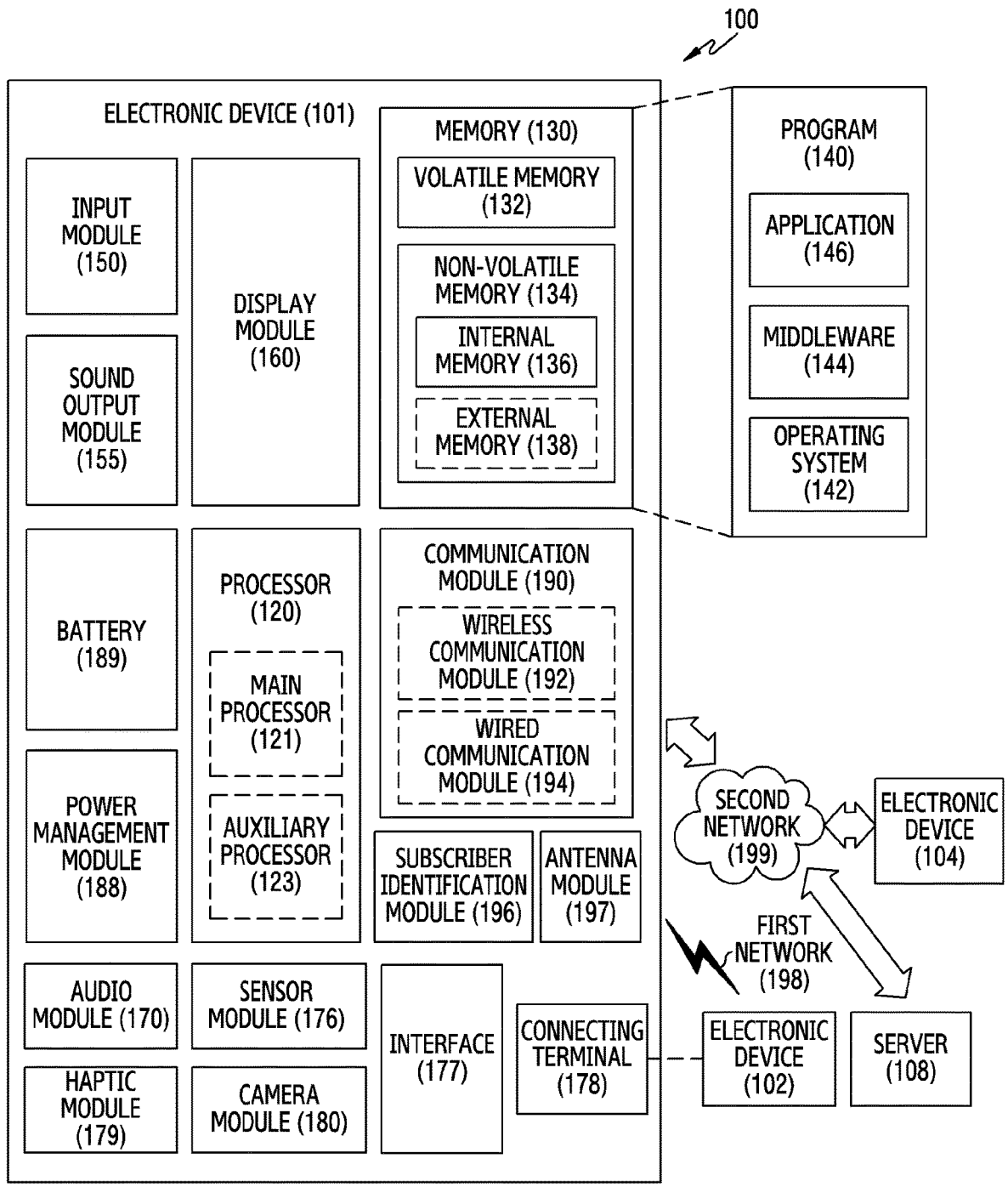
FIG. 1 illustrates an electronic device inside a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
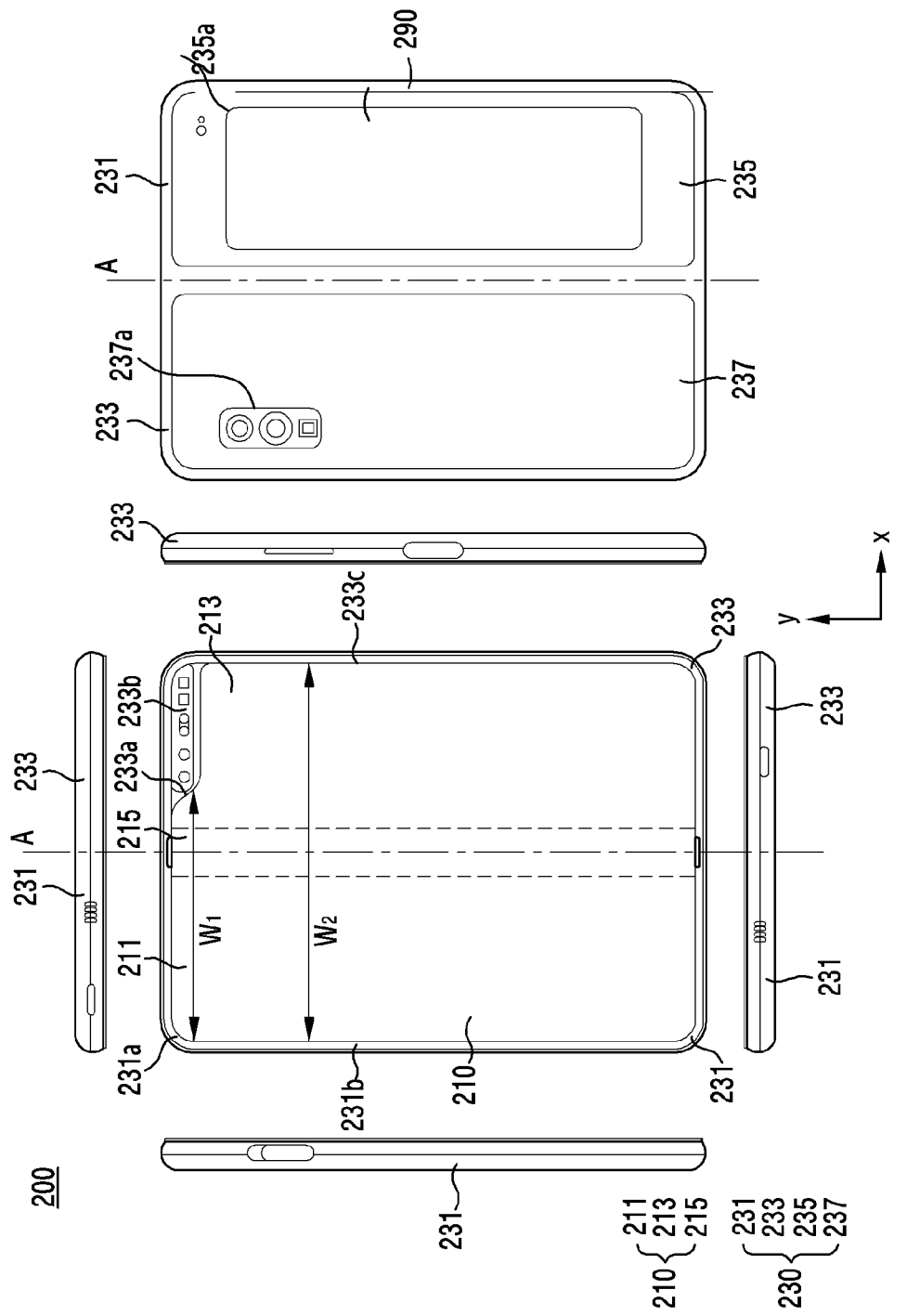
FIG. 2A illustrates an electronic device in a flat state according to an embodiment of the disclosure.
Figure 2B:
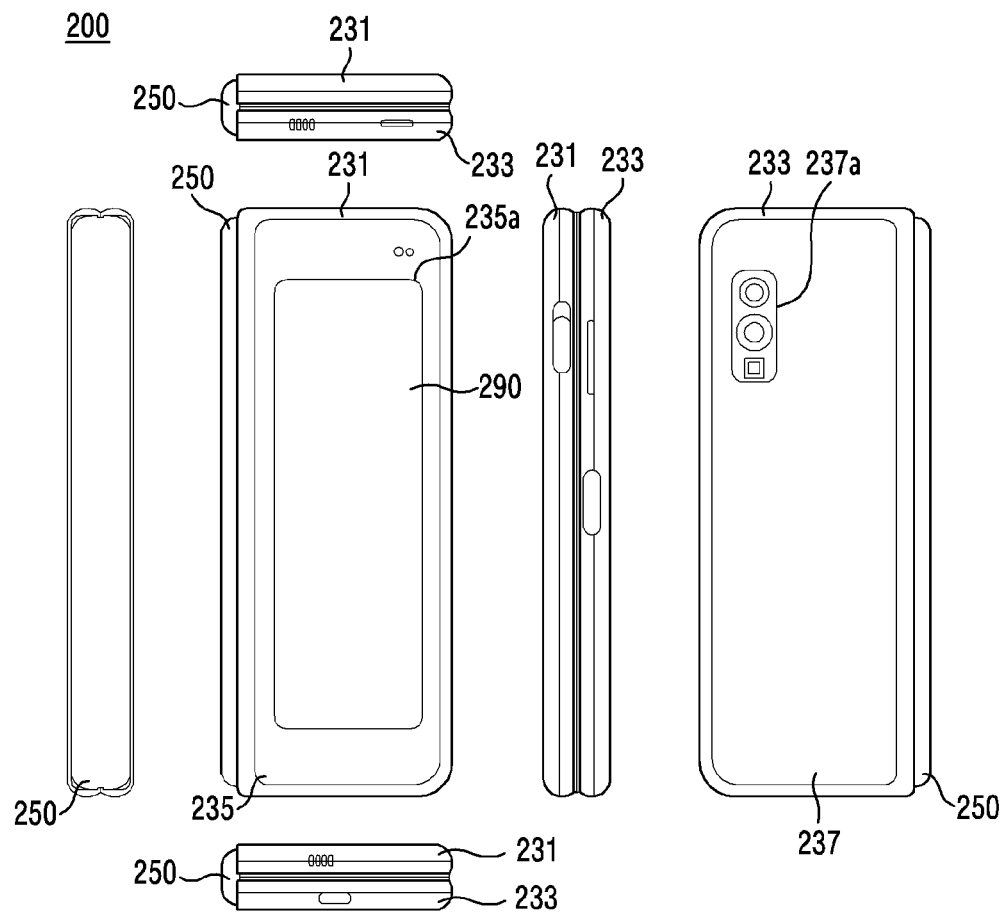
FIG. 2B illustrates an electronic device in a folded state according to an embodiment of the disclosure.

FIG. 2A illustrates an electronic device in a flat state according to an embodiment of the disclosure. FIG. 2B illustrates an electronic device in a folded state according to an embodiment of the disclosure.

Referring to FIGS. 2A and 2B, in an embodiment of the disclosure, an electronic device 200 may include a foldable housing 230, a hinge cover 250 configured to cover a foldable portion of the foldable housing, and a flexible or foldable display 210 (hereinafter, referred to as a display 210) disposed in a space formed by the foldable housing 230. In the disclosure, the surface on which the display 210 is disposed is defined as the first surface or front surface of the electronic device 200. In addition, the opposite surface of the front surface is defined as the second surface or rear surface of the electronic device 200. Furthermore, the surface surrounding the space between the front surface and the rear surface is defined as the third surface or side surface of the electronic device 200.

In an embodiment of the disclosure, the foldable housing 230 may include a first housing structure 231, a second housing structure 233 including a sensor region 233b, a first rear cover 235, and a second rear cover 237. The foldable housing 230 of the electronic device 200 is not limited to the form and coupling illustrated in FIGS. 2A and 2B, and may be implemented by a combination and/or coupling of other shapes or components. For example, in another embodiment of the disclosure, the first housing structure 231 and the first rear cover 235 may be formed integrally, and the second housing structure 233 and the second rear cover 237 may be formed integrally.

In the illustrated embodiment of the disclosure, the first housing structure 231 and the second housing structure 233 may be disposed on both sides of a folding axis (axis A), and may be shaped to be symmetric with regard to the folding axis A as a whole. As will be described later, the angle or distance between the first housing structure 231 and the second housing structure 233 may vary according to whether the electronic device 200 is in a flat state, in a folded state, or in an intermediate state. In the illustrated embodiment of the disclosure, the second housing structure 233 further includes the sensor region 233b in which various sensors are disposed, unlike the first housing structure 231, but may have a mutually symmetric shape in other regions.

In an embodiment of the disclosure, as illustrated in FIG. 1, the first housing structure 231 and the second housing structure 233 may together form a recess in which the display 210 is received. In the illustrated embodiment of the disclosure, due to the sensor region 233b, the recess may have two or more widths in a direction perpendicular to the folding axis (axis A).

For example, the recess may have (1) a first width w1 between a first portion 231a of the first housing structure 231, which is parallel to the folding axis (axis A), and a first portion 233a of the second housing structure 233, which is formed on a periphery of the sensor region 233b, and (2) a second width w2 between a second portion 231b of the first housing structure 231 and a second portion 233c of the second housing structure 233, which does not correspond to the sensor region 233b, and which is parallel to the folding axis (axis A). In this case, the second width w2 may be formed larger than the first width w1. In other words, the first portion 231a of the first housing structure 231 and the first portion 233a of the second housing structure 233, which have mutually asymmetric shapes, may form the first width w1 of the recess, and the second portion 231b of the first housing structure 231 and the second portion 233c of the second housing structure 233, which have mutually symmetric shapes, may form the second width w2 of the recess. In an embodiment of the disclosure, the first portion 233a and the second portion 233c of the second housing structure 233 may have different distances from the folding axis (axis A). The width of the recess is not limited to the illustrated example. In various embodiments of the disclosure, the recess may have multiple widths due to the form of the sensor region 233b or due to the asymmetrically shaped portions of the first housing structure 231 and the second housing structure 233.

In an embodiment of the disclosure, the first housing structure 231 and the second housing structure 233 may have at least a part made of a metal material or a nonmetal material having a level of rigidity selected to support the display 210.

In an embodiment of the disclosure, the sensor region 233b may be formed to have a certain region adjacent to a corner of the second housing structure 233. However, the disposition, shape, and size of the sensor region 233b are not limited to the illustrated example. For example, in another embodiment of the disclosure, the sensor region 233b may be provided in a region between another corner of the second housing structure 233 or the top corner and the bottom corner thereof. In an embodiment of the disclosure, components for performing various functions embedded in the electronic device 200 may be exposed to the front surface of the electronic device 200 through the sensor region 233*b*, or through one or more openings provided in the sensor region 233*b*. In various embodiments of the disclosure, the components may include various kinds of sensors. The sensors may include, for example, at least one of a front camera, a receiver, or a proximity sensor.

The first rear cover 235 may be disposed on one side of the folding axis (axis A) on the rear surface of the electronic device 200, and may have a substantially rectangular periphery, for example, and the periphery may be surrounded by the first housing structure 231. Similarly, the second rear cover 237 may be disposed on the other side of the folding axis (axis A) on the rear surface of the electronic device 200, and may have a periphery surrounded by the second housing structure 233.

In the illustrated embodiment of the disclosure, the first rear cover 235 and the second rear cover 237 may have substantially symmetric shapes around the folding axis (axis A). However, the first rear cover 235 and the second rear cover 237 do not necessarily have mutually symmetric shapes, and in another embodiment of the disclosure, the electronic device 200 may include a first rear cover 235 and a second rear cover 237 in various shapes. In another embodiment of the disclosure, the first rear cover 235 may be formed integrally with the first housing structure 231, and the second rear cover 237 may be formed integrally with the second housing structure 233.

In an embodiment of the disclosure, the first rear cover 235, the second rear cover 237, the first housing structure 231, and the second housing structure 233 may form a space in which various components (for example, a printed circuit board or a battery) of the electronic device 200 may be disposed. In an embodiment of the disclosure, one or more components may be disposed on the rear surface of the electronic device 200 or may be visually exposed. For example, at least a part of a sub-display 290 may be visually exposed through a first rear region 235*a* of the first rear cover 235. In another embodiment of the disclosure, one or more components or sensors may be visually exposed through a second rear region 237*a* of the second rear cover 237. In various embodiments of the disclosure, the sensors may include a proximity sensor and/or a rear camera.

Referring to FIG. 2B, the hinge cover 250 may be disposed between the first housing structure 231 and the second housing structure 233 and configured to cover an internal component (for example, a hinge structure). In an embodiment of the disclosure, the hinge cover 250 may be partially covered by the first housing structure 231 and the second housing structure 233 or exposed to the outside according to the state (flat state or folded state) of the electronic device 200.

For example, when the electronic device 200 is in a flat state as illustrated in FIG. 2A, the hinge cover 250 may be covered by the first housing structure 231 and the second housing structure 233 and thus not exposed. For example, when the electronic device 200 is in a folded state (for example, fully folded state) as illustrated in FIG. 2A, the hinge cover 250 may be exposed to the outside between the first housing structure 231 and the second housing structure 233. For example, in an intermediate state in which the first housing structure 231 and the second housing structure 233 are folded with a certain angle, the hinge cover 250 may be partially exposed to the outside between the first housing structure 231 and the second housing structure 233. However, the region exposed in this case may be less than that in the fully folded state. In an embodiment of the disclosure, the hinge cover 250 may include a curved surface.

The display 210 may be disposed in a space formed by the foldable housing 230. For example, the display 210 may be seated in a recess formed by the foldable housing 230 so as to constitute the majority of the front surface of the electronic device 200.

Therefore, the front surface of the electronic device 200 may include a display 210, a partial region of the of the first housing structure 231 adjacent to the display 210, and a partial region of the of the second housing structure 233 adjacent to the display 210. In addition, the rear surface of the electronic device 200 may include a first rear cover 235, a partial region of the of the first housing structure 231 adjacent to the first rear cover 235, a second rear cover 237, and a partial region of the of the second housing structure 233 adjacent to the second rear cover 237.

The display 210 may refer to a display, at least a partial region of which may be deformed into a flat surface or a curved surface. In an embodiment of the disclosure, the display 210 may include a folding region 215, a first region 211 disposed on one side with reference to the folding region 215 (on the left side of the folding region 215 illustrated in FIG. 2A), and a second region 213 disposed on the other side (on the right side of the folding region 215 illustrated in FIG. 2A).

The region division of the display 210 illustrated in FIG. 2A, and the display 210 may be divided into multiple (for example, four or more, or two) regions according to the structure or function of the display 210. For example, although the region of the display 210 may be divided according to the folding region 215 expending parallel to the y-axis or the folding axis (axis A) in the embodiment illustrated in FIG. 2A, the region of the display 210 may be divided, in another embodiment of the disclosure, with reference to another folding region (for example, a folding region parallel to the x-axis) or another folding axis (for example, a folding axis parallel to the x-axis).

The first region 211 and the second region 213 may have symmetric shapes around the folding region 215 as a whole. Unlike the first region 211, the second region 213 may include a cut notch, depending on the existence of the sensor region 233*b*, but other regions thereof may be shaped to be symmetric to the first region 211. In other words, the first region 211 and the second region 213 may include mutually symmetrically shaped portions and mutually asymmetrically shaped portions.

Hereinafter, operations of the first housing structure 231 and the second housing structure 233 and respective regions of the display 210 will be described according to the state of the electronic device 200 (for example, a flat state and a folded state).

In an embodiment of the disclosure, when the electronic device 200 is in a flat state (for example, the state in FIG. 2A), the first housing structure 231 and the second housing structure 233 may be disposed to face in an identical direction with an angle of 180° therebetween. The surface of the first region 211 of the display 210 and the surface of the second region 213 thereof may face in an identical direction (for example, forward direction of the electronic device) while forming 180° with each other. The folding region 215 may form an identical plane with the first region 211 and the second region 213.

In an embodiment of the disclosure, when the electronic device 200 is in a folded state (for example, the state in FIG. 2B), the first housing structure 231 and the second housing structure 233 may be disposed to face each other. The surface of the first region 211 of the display 210 and the surface of the second region 213 thereof may face each other while forming a narrow angle (for example, between 0° and 10°) with each other. At least a part of the folding region 215 may be configured as a curved surface having a certain curvature.

In an embodiment of the disclosure, when the electronic device 200 is in an intermediate state (for example, an intermediate state when changing from the state in FIG. 2A to the state in FIG. 2B), the first housing structure 231 and the second housing structure 233 may be disposed with a certain angle with each other. The surface of the first region 211 of the display 210 and the surface of the second region 213 thereof may form an angle larger than that in the folded state and smaller than that in the flat state. At least a part of the folding region 215 may be configured as a curved surface having a certain curvature, and the curvature may be smaller than that in the folded state.

Figure 3:
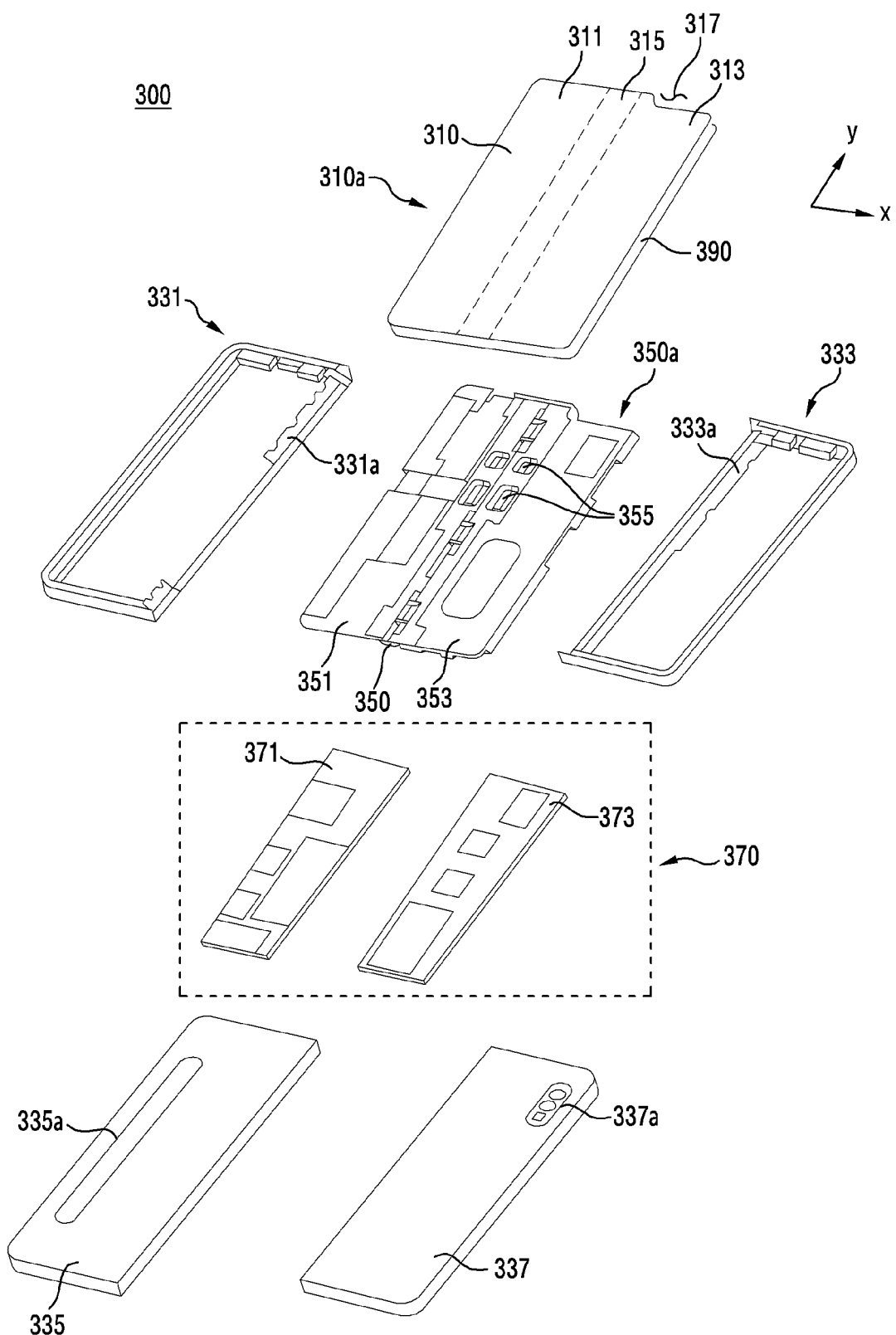
FIG. 3 is an exploded perspective view of an electronic device according to an embodiment of the disclosure.

FIG. 3 is an exploded perspective view of an electronic device according to an embodiment of the disclosure.

Referring to FIG. 3, in an embodiment of the disclosure, the electronic device 300 may include a display unit 310a, a bracket assembly 350a, a substrate unit 370, a first housing structure 331, a second housing structure 333, a first rear cover 335, and a second rear cover 337. In the disclosure, the display unit 310a may be referred to as a display module or a display assembly.

The display unit 310a may include a display 310 and one or more plates or layers 390 on which the display 310 is seated. In an embodiment of the disclosure, the plate 390 may be disposed between the display 310 and the bracket assembly 350a. The display 310 may be disposed on at least a part of one surface (the upper surface with reference to FIG. 3) of the plate 390. The plate 390 may be shaped to correspond to the display 310. For example, a partial region of the plate 390 may be shaped to correspond to a notch 317 of the display 310.

The bracket assembly 350a may include a first bracket 351, a second bracket 353, a hinge structure disposed between the first bracket 351 and the second bracket 353, a hinge cover 350 configured to cover the hinge structure when seen from the outside, and a wire member 355 (for example, a flexible printed circuit (FPC)) extending across the first bracket 351 and the second bracket 353.

In an embodiment of the disclosure, the bracket assembly 350a may be disposed between the plate 390 and the substrate unit 370. For example, the first bracket 351 may be disposed between a first region 311 of the display 310 and a first substrate 371. The second bracket 353 may be disposed between a second region 313 of the display 310 and a second substrate 373.

In an embodiment of the disclosure, at least a part of the hinge structure and the wire member 355 may be disposed inside the bracket assembly 350a. The wire member 355 may be disposed in a direction so as to extend across the first bracket 351 and the second bracket 353 (for example, in the x-axis direction). The wire member 355 may be disposed in a direction (for example, the x-axis direction) perpendicular to the folding axis (for example, the y-axis or the folding axis (axis A) in FIG. 2A) of a folding region 315 of the electronic device 300.

The substrate unit 370 may include a first substrate 371 disposed near the first bracket 351 and a second substrate 373 disposed near the second bracket 353, as mentioned above. The first substrate 371 and the second substrate 373 may be disposed inside a space formed by the bracket assembly 350a, the first housing structure 331, the second housing structure 333, the first rear cover 335, and the second rear cover 337. Components for implementing various functions of the electronic device 300 may be mounted on the first substrate 371 and the second substrate 373.

The first housing structure 331 and the second housing structure 333 may be assembled to each other so as to be coupled to both sides of the bracket assembly 350a while the display unit 310a remains coupled to the bracket assembly 350a. As will be described later, the first housing structure 331 and the second housing structure 333 may slide on both sides of the bracket assembly 350a so as to be coupled to the bracket assembly 350a.

In an embodiment of the disclosure, the first housing structure 331 may include a first rotation support surface 331a, and the second housing structure 333 may include a second rotation support surface 333a corresponding to the first rotation support surface 331a. the first rotation support surface 331a and the second rotation support surface 333a may include a curved surface corresponding to a curved surface included in the hinge cover 350.

In an embodiment of the disclosure, the first rotation support surface 331a and the second rotation support surface 333a may cover the hinge cover 350 when the electronic device 300 is in a flat state (for example, the state in FIG. 2A) such that the hinge cover 350 is not exposed to the rear surface of the electronic device 300 or is exposed minimally. Meanwhile, the first rotation support surface 331a and the second rotation support surface 333a may rotate along the curved surface included in the hinge cover 350 when the electronic device 300 is in a folded state (for example, the state in FIG. 2B) such that the hinge cover 350 is exposed to the rear surface of the electronic device 300 maximally.

Figure 4A:
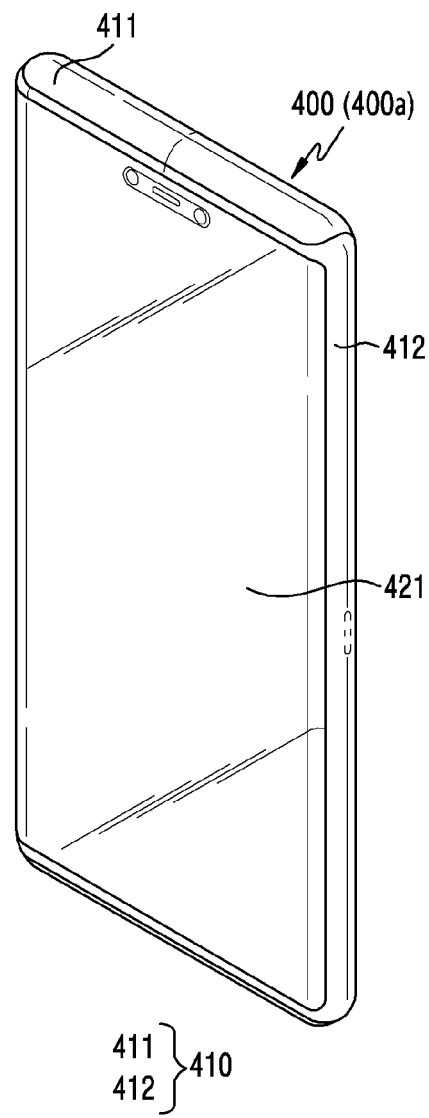
FIG. 4A is a front view an electronic device in a first state according to an embodiment of the disclosure.
Figure 4B:
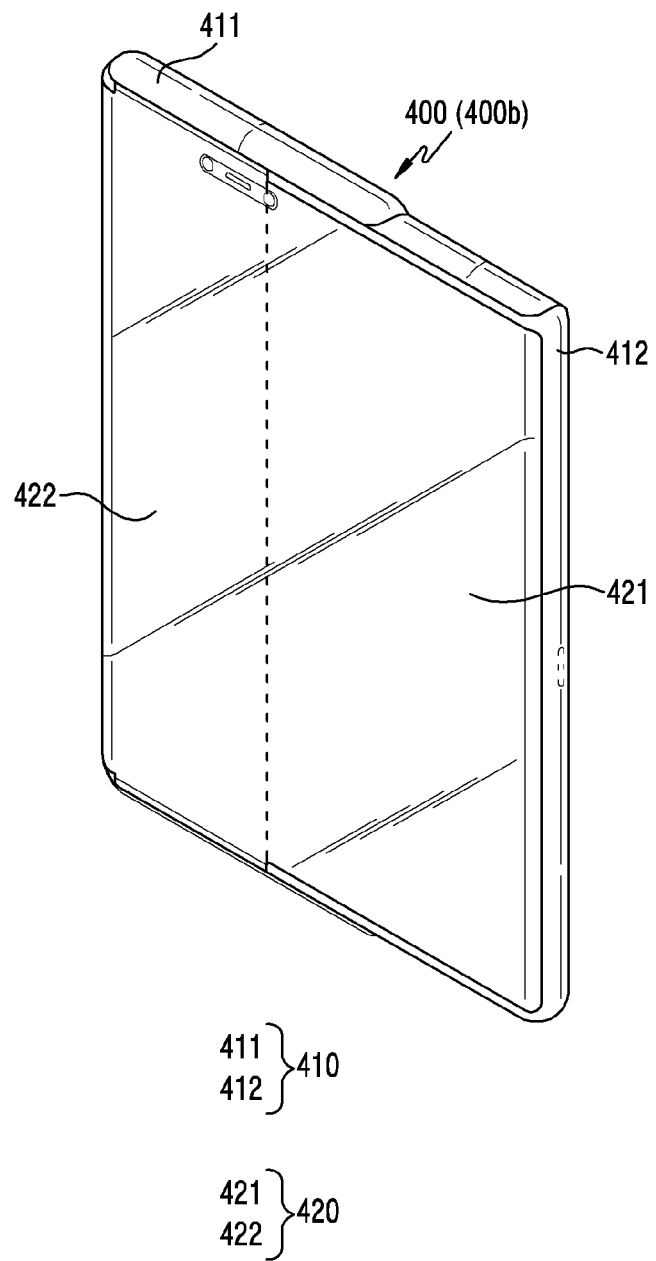
FIG. 4B is a front view an electronic device in a second state according to an embodiment of the disclosure.

FIG. 4A is a front view an electronic device in a first state according to an embodiment of the disclosure. FIG. 4B is a front view an electronic device in a second state according to an embodiment of the disclosure.

Referring to FIGS. 4A and 4B, a display 420 may be positioned on one surface of the electronic device 400 according to an embodiment. The surface on which the display 420 is positioned will hereinafter be referred to as the front surface. According to an embodiment of the disclosure, the display 420 may occupy the majority of the front surface of the electronic device 400. According to an embodiment of the disclosure, the display 420 may include a flat form and a curved form. On the front surface of the electronic device 400, the display 420 and a housing 410 which surrounds at least a part of the periphery of the display 420 may be disposed. According to an embodiment of the disclosure, the housing 410 may form a partial region of the front surface of the electronic device 400, the side surface, and the rear surface thereof. According to another embodiment of the disclosure, the housing 410 may form a partial region of the side surface of the electronic device 400 and the rear surface thereof. According to an embodiment of the disclosure, the housing 410 may include a first housing 411 and a second housing 412 capable of moving with regard to the first housing 411.

According to an embodiment of the disclosure, the display 420 may include a first region 421 which may be coupled to a second housing 112, and a second region 422 which extends from the first region 421 and can move into the housing 410 of the electronic device 400. According to an embodiment of the disclosure, the first region 421 of the display 420 may be visibly exposed to the outside regardless of movements of the second housing 412. According to an embodiment of the disclosure, if the electronic device 400 is switched from a first state 400a to a second state 400b by a movement of the second housing 412, the second region 422 of the display 420 may be moved from inside the electronic device 400 to the outside and may be seen from the outside. According to an embodiment of the disclosure, if the electronic device 400 is switched from the second state 400b to the first state 400a by a movement of the second housing 412, the second region 422 of the display 420 may be moved into the electronic device 400 and may not be seen from the outside.

Figure 5:
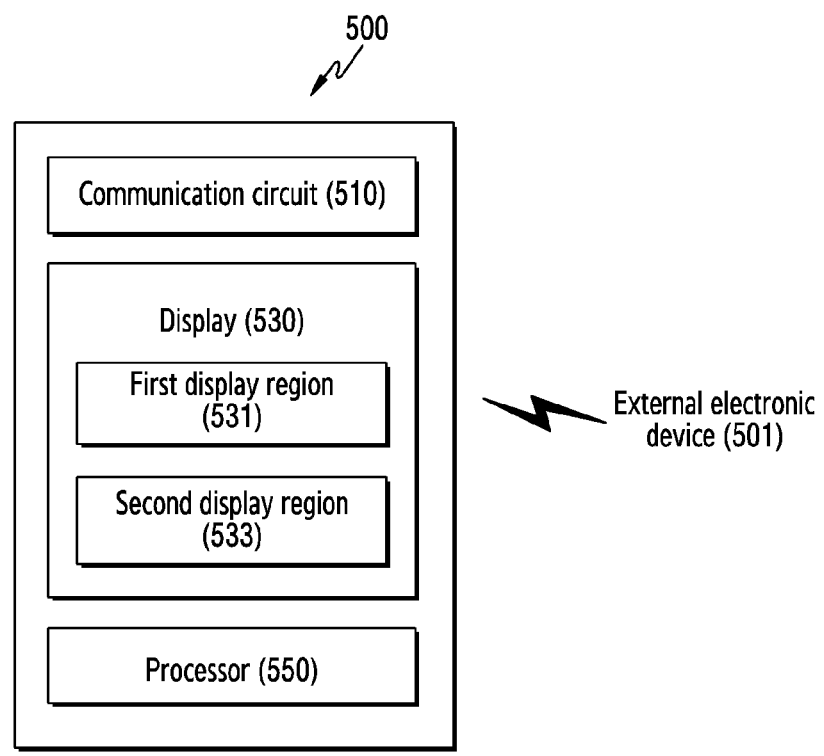
FIG. 5 is a block diagram of an electronic device according to an embodiment of the disclosure.

FIG. 5 is a block diagram of an electronic device according to an embodiment of the disclosure.

Referring to FIG. 5, an electronic device 500 (for example, the electronic device 101 in FIG. 1) may predict the user's intent and accordingly display split screens in a display region (for example, a first display region 531 and a second display region 533), based on whether the electronic device 500 is connected to an external electronic device 501 (for example, the electronic device 102 or the electronic device 104 in FIG. 1) or not and whether a display 530 (for example, the display module 160 in FIG. 1) is expanded or not.

The electronic device 500 for providing the above-mentioned function may include a communication circuit 510, the display 530, and a processor 550, referring to FIG. 5. However, the components of the electronic device 500 are not limited thereto. In various embodiments of the disclosure, at least one of the above-mentioned components of the electronic device 500 may be omitted, or the electronic device 500 may further include at least one other component. For example, the electronic device 500 may further include a memory (for example, the memory 130 in FIG. 1).

According to an embodiment of the disclosure, the communication circuit 510 (for example, the communication module 190 in FIG. 1) may support establishment of a wired or wireless communication channel between the electronic device 500 and an external electronic device 501, and communication performed through the established communication channel. In an embodiment of the disclosure, the communication circuit 510 may communicate with the external electronic device 501 through a short-range communication network (for example, the first network 198 in FIG. 1) or a long-range communication network (for example, the second network 199 in FIG. 1). For example, the communication circuit 510 may connect the electronic device 500 and the external electronic device 501 through the short-range or long-range communication network. In addition, the communication circuit 510 may transmit/receive signals (for example, commands or data) with the external electronic device 501 connected through the communication network.

According to an embodiment of the disclosure, the display 530 may display a screen in the first display region 531 and/or the second display region 533, based on a first state or a second state. In an embodiment of the disclosure, the display 530 may display a screen in the first display region 531, based on a first state corresponding to a reduction state. The reduction state may refer to a state in which the area of the display 530 exposed to the outside (for example, in the direction in which the user views the same) corresponds to a first area, for example. In an embodiment of the disclosure, the display 530 may display a screen in the first display region 531 and in the second display region 533, which is expanded from the first display region 531, based on a second state corresponding to an expansion state. The expansion state may refer to a state in which the area of the display 530 exposed to the outside corresponds to a second area (for example, an area larger than the first area), for example. In an embodiment of the disclosure, the display 530 may display a first screen in the first state under the control of the processor 550, or may split and display a first screen, a second screen, and/or a third screen in the second state.

According to various embodiments of the disclosure, the form of the display 530 may be changed. For example, provided that the display 530 is a foldable display, a change may occur from a form (for example, a first state) in which one surface (for example, the rear surface) of the first display region 531 and one surface (for example, the rear surface) of the second display region 533 face at a first angle to a form (for example, a second state) in which one surface of the first display region 531 and one surface of the second display region 533 are unfolded at a second angle (for example, an angle larger than the first angle). As another example, provided that the display 530 is a slidable display, a change may occur from a form (for example, a first state) in which the second display region 533 is wound around one surface (for example, the rear surface) of the first display region 531 to a form (for example, a second state) in which one surface of the first display region 531 and one surface of the second display region 533 are unfolded at the second angle.

According to various embodiments of the disclosure, the display 530 may interwork with one of a first state (for example, a folded state or a wound state) and a second state (for example, a flat state) such that, around a folding region (or a sliding region), a curved surface is formed (for example, a folded state or a wound state) or a flat surface is formed (for example, a flat state).

According to an embodiment of the disclosure, the processor 550 (for example, the processor 120 in FIG. 1) may control split screens to be displayed in the first display region 531 and in the second display region 533, based on whether connection to an external electronic device 501 exists or not, and whether the display 530 undergoes a state transition or not (for example, a transition from a first state to a second state). For example, if a transition occurs from a first state to a second state as a result of expansion of the display 530 while a first screen is displayed on the first display region 531 as a result of executing a first application, and if connected to an external electronic device 501 through the communication circuit 510, the processor 550 may control a second screen to be displayed in the second display region 533. The second screen may be related to functions that can be performed in the external electronic device 501 and functions of the first application.

According to an embodiment of the disclosure, the processor 550 may control a second screen to be displayed in the second display region 533 with regard to each function that can be performed in the external electronic device 501, based on whether connection to the external electronic device 501 exists or not, and whether or not a transition occurs from a first state to a second state as a result of expansion of the display 530. In an embodiment of the disclosure, functions that can be performed in the external electronic device 501 may be at least one of a data transmitting/receiving function, a data executing function, and a data acquiring function. According to each function described above, the second screen displayed in the second display region 533 may interwork with functions of the first application.

According to an embodiment of the disclosure, if connected to an external electronic device 501, and if a transition has occurred from a first state to a second state as a result of expansion of the display 530, the processor 550 may control a second screen for controlling a data transmitting/receiving function that can be performed in the connected external electronic device 501 in the second display region 533. In an embodiment of the disclosure, in order for the external electronic device 501 to perform the data transmitting/receiving function, the processor 550 may transmit data to the external electronic device 501 or receive data from the external electronic device 501 by using the data transmitting/receiving function of the first application.

According to an embodiment of the disclosure, if connected to an external electronic device 501, and if a transition has occurred from a first state to a second state as a result of expansion of the display 530, the processor 550 may control a second screen for controlling a data executing function that can be performed in the connected external electronic device 501 in the second display region 533. In an embodiment of the disclosure, in order for the external electronic device 501 to perform the data executing function, the processor 550 may transmit data to the external electronic device 501 by using the data transmitting function of the first application.

According to an embodiment of the disclosure, if connected to an external electronic device 501, and if a transition has occurred from a first state to a second state as a result of expansion of the display 530, the processor 550 may control a second screen for identifying a data acquiring function that can be performed in the connected external electronic device 501 in the second display region 533. In an embodiment of the disclosure, in order to identify data acquired from the external electronic device 501, the processor 550 may control a second screen related to an additional function (for example, displaying the heart rate when measuring the running time) of the first application to be displayed in the second display region 533, based on the acquired data.

According to an embodiment of the disclosure, based on whether connection to an external electronic device 501 exists or not, based on whether or not a transition occurs from a first state to a second state as a result of expansion of the display 530, and based on the type of an input received from the external electronic device 501, the processor 550 may control a second screen for executing a function corresponding to the type of the received input in the second display region 533. In an embodiment of the disclosure, in order to respond to a signal (for example, a command) transmitting function that can be performed in the external electronic device 501, the processor 550 may control a second screen for executing a function (for example, a camera function) that can be performed in the electronic device 500 to be displayed in the second display region 533, based on the type of the received input.

According to an embodiment of the disclosure, if connected to multiple external electronic devices 501, and if a transition has occurred from a first state to a second state as a result of expansion of the display 530, the processor 550 may control at least one screen (for example, a second screen and/or a third screen) related to a function that can be performed in the multiple external electronic devices 501 to be displayed in the second display region 533.

According to various embodiments of the disclosure, the external electronic device 501 may be an electronic device capable of supporting communication performed with the electronic device 500 through a wired or wireless communication channel. For example, the external electronic device 501 may include a personal computer (PC), a television (TV), a speaker, an earphone, a closed circuit television (CCTV), a wearable device, a vehicle, a stylus pen, and the like.

Figure 6:
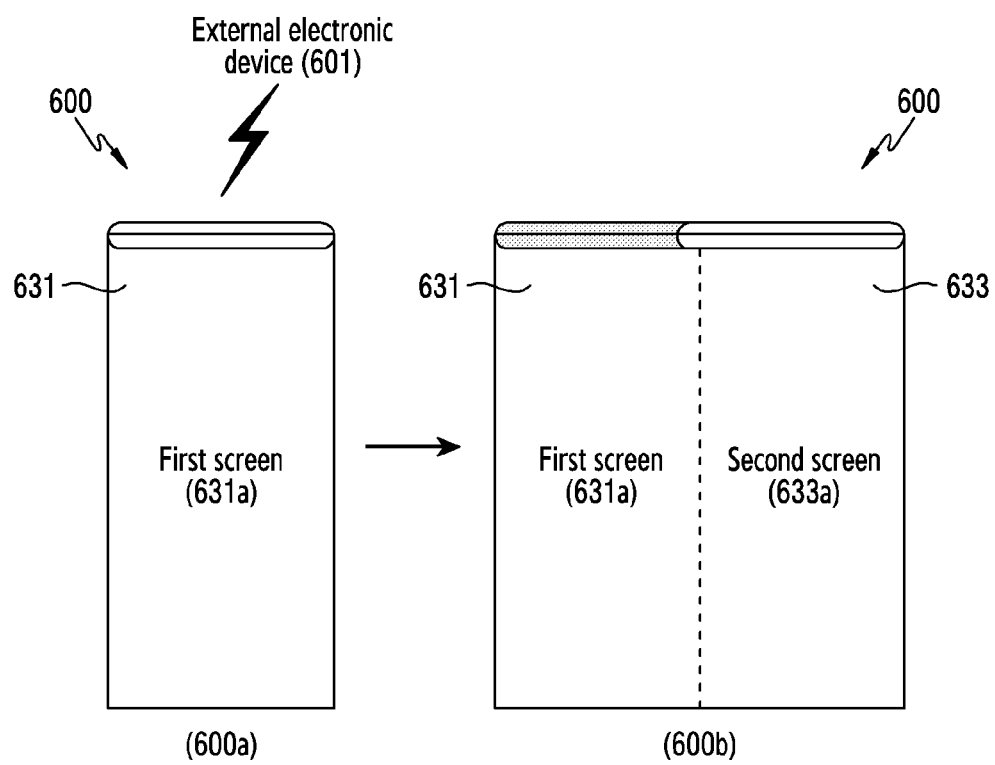
FIG. 6 illustrates spit screens displayed in a display region, based on whether a display of an electronic device is expanded or not and whether the electronic device is connected to an external electronic device or not, according to an embodiment of the disclosure.

FIG. 6 illustrates spit screens displayed in a display region, based on whether a display of an electronic device is expanded or not and whether the electronic device is connected to an external electronic device or not, according to an embodiment of the disclosure.

Referring to FIG. 6, an electronic device 600 display a screen in a first display region 631 (for example, the first display region 531 in FIG. 5) and/or in a second display region 633 (for example, the second display region 533 in FIG. 5), based on a first state 600a or a second state 600b according to whether the display (for example, the display 530 in FIG. 5) is expanded or not.

Referring to the first state 600a, the electronic device 600 may display a first screen 631a in the first display region 631 as a result of execution of a first application in a state in which the display 530 is reduced. The state in which the display 530 is reduced may be a state in which the form of the display 530 is reduced, for example. In an embodiment of the disclosure, the electronic device 600 may identify whether or not a transition occurs from the state in which the display 530 is reduced to a state in which the display 530 is expanded, while the first screen 631a is displayed in the first display region 631. In an embodiment of the disclosure, the electronic device 600 may be connected to an external electronic device 601.

Referring to the second state 600b, in a state in which the display 530 is expanded, the electronic device 600 may display a first screen 631a in the first display region 631 and may display a second screen 633a in the second display region 633. The state in which the display is expanded may correspond to a state in which the form of the display 530 is expanded. The second screen 633a may be a screen related to a function that can be performed in the external electronic device 601 and a function of the first application, for example.

Figure 7:
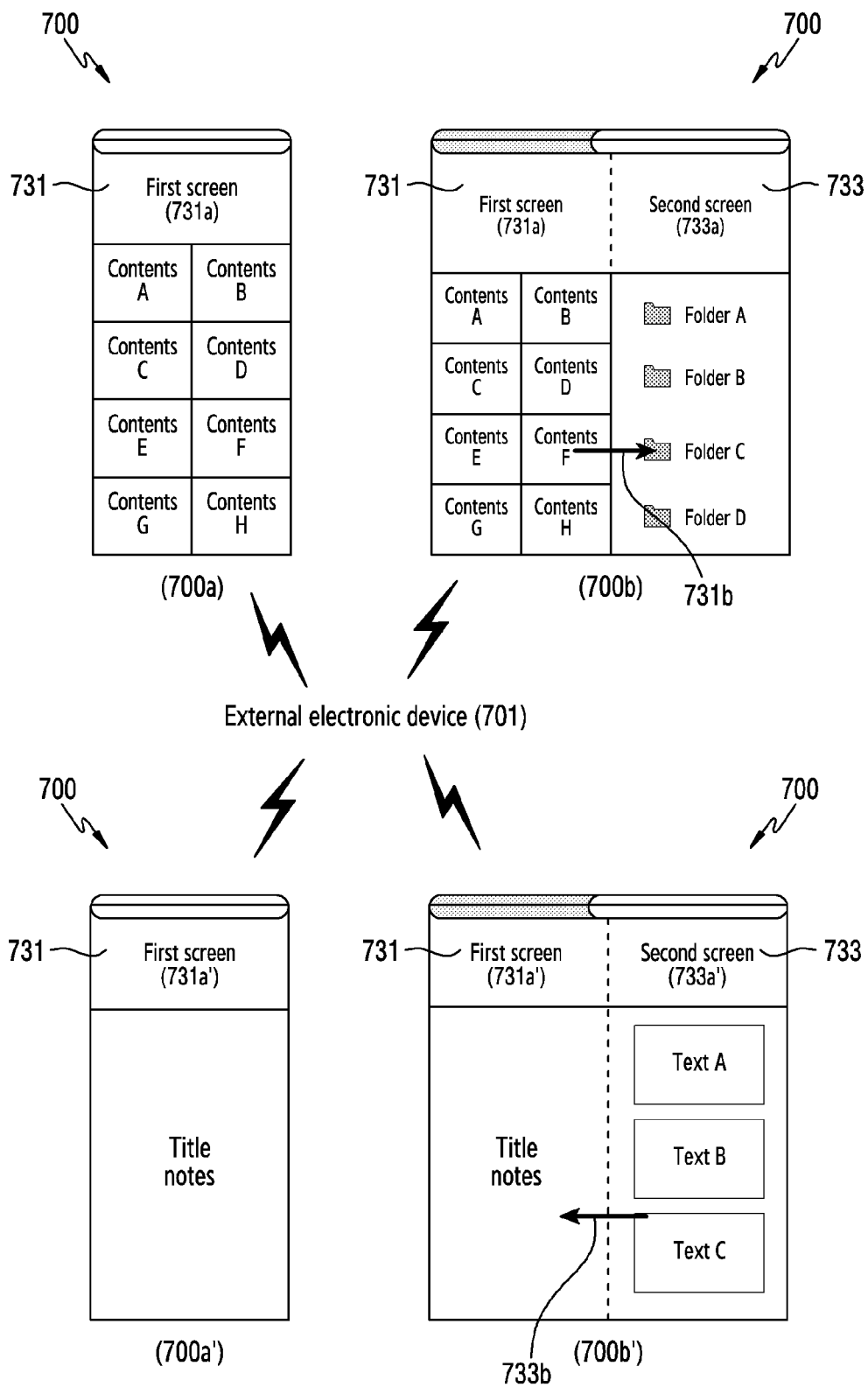
FIG. 7 illustrates a screen for controlling data transmission/reception, based on whether a display of an electronic device is expanded or not and whether the electronic device is connected to an external electronic device or not, according to an embodiment of the disclosure.

FIG. 7 illustrates a screen for controlling data transmission/reception, based on whether a display of an electronic device is expanded or not and whether the electronic device is connected to an external electronic device or not, according to an embodiment of the disclosure.

Referring to FIG. 7, an electronic device 700 may display a screen in a first display region 731 and/or in a second display region 733, based on a first state 700a or a second state 700b.

Referring to the first state 700a, the electronic device 700 may display a first screen 731a in the first display region 731 as a result of executing a first application. The first application may include a function of transmitting/receiving data (for example, contents), for example. In an embodiment of the disclosure, the electronic device 700 may identify whether or not a transition occurs from to the first state 700a (for example, reduction state) to the second state 700b (for example, expansion state) while the first screen 731a is displayed in the first display region 731. In an embodiment of the disclosure, the electronic device 700 may be connected to an external electronic device 701. The external electronic device 701 may be an electronic device (for example, a PC) supporting a data transmitting/receiving function, for example.

Referring to the second state 700b, the electronic device 700 may display a first screen 731a in the first display region 731 and may display a second screen 733a in the second display region 733. The second screen 733a may be a screen for supporting a data transmitting/receiving function that can be performed in the external electronic device 701, for example. In an embodiment of the disclosure, the electronic device 700 may transmit data displayed inside the first screen 731a to the external electronic device 701 in response to an input (for example, drag and drop) interlinked from the first screen 731a to the second screen 733a.

Referring to FIG. 7, the electronic device 700 may display a screen in the first display region 731 and/or in the second display region 733, based on a first state 700a' or a second state 700b'.

Referring to the first state 700a', the electronic device 700 may display a first screen 731a' in the first display region 731 as a result of executing a first application. The first application may include, for example, a function of transmitting/receiving data (for example, notes). In an embodiment of the disclosure, the electronic device 700 may identify whether or not a transition occurs from the first state 700a' (for example, reduction state) to a second state 700b' (for example, expansion state) while the first screen 731a' is displayed in the first display region 731. In an embodiment of the disclosure, the electronic device 700 may be connected to an external electronic device 701. The external electronic device 701 may be an electronic device (for example, a PC) supporting a data transmitting/receiving function, for example.

Referring to the second state 700b', the electronic device 700 may display a first screen 731a' in the first display region 731 and may display a second screen 733a' in the second display region 733. The second screen 733a' may be a screen for supporting a data transmitting/receiving function that can be performed in the external electronic device 701, for example. In an embodiment of the disclosure, the electronic device 700 may transmit data displayed inside the second screen 733a' to the external electronic device 701 in response to an input (for example, drag and drop) interlinked from the second screen 733a' to the first screen 731a'.

Figure 8A:
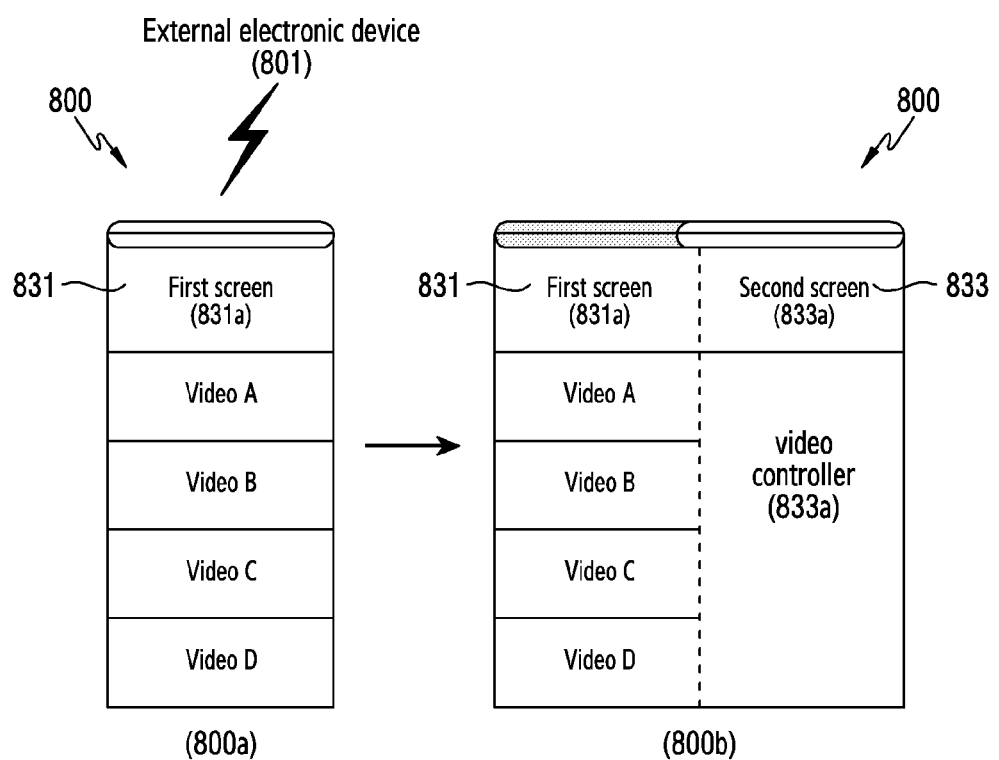
FIG. 8A illustrates a screen for controlling data execution, based on whether a display of an electronic device is expanded or not and whether the electronic device is connected to an external electronic device or not, according to an embodiment of the disclosure.

FIG. 8A illustrates a screen for controlling data execution, based on whether a display of an electronic device is expanded or not and whether the electronic device is connected to an external electronic device or not, according to an embodiment of the disclosure.

Referring to FIG. 8A, an electronic device 800 may display a screen in a first display region 831 and/or in the second display region 833, based on a first state 800a or a second state 800b.

Referring to the first state 800a, the electronic device 800 may display a first screen 831a in the first display region 831 as a result of executing a first application. The first application may include, for example, a function of transmitting/receiving data (for example, videos). In an embodiment of the disclosure, the electronic device 800 may identify whether or not a transition occurs from the first state 800a (for example, reduction state) to a second state 800b (for example, expansion state) while the first screen 831a is displayed in the first display region 831. In an embodiment of the disclosure, the electronic device 800 may be connected to an external electronic device 801. The external electronic device 801 may be an electronic device (for example, a TV) supporting a data executing function, for example.

Referring to the second state 800b, the electronic device 800 may display a first screen 831a in the first display region 831 and may display a second screen 833a in the second display region 833. The second screen 833a may be a screen for controlling a data executing function that can be performed in the external electronic device 801, for example. In an embodiment of the disclosure, the electronic device 800 may control data executed in the external electronic device 801 through the second screen 833a while data displayed through the first screen 831a is executed in the external electronic device 801.

Figure 8B:
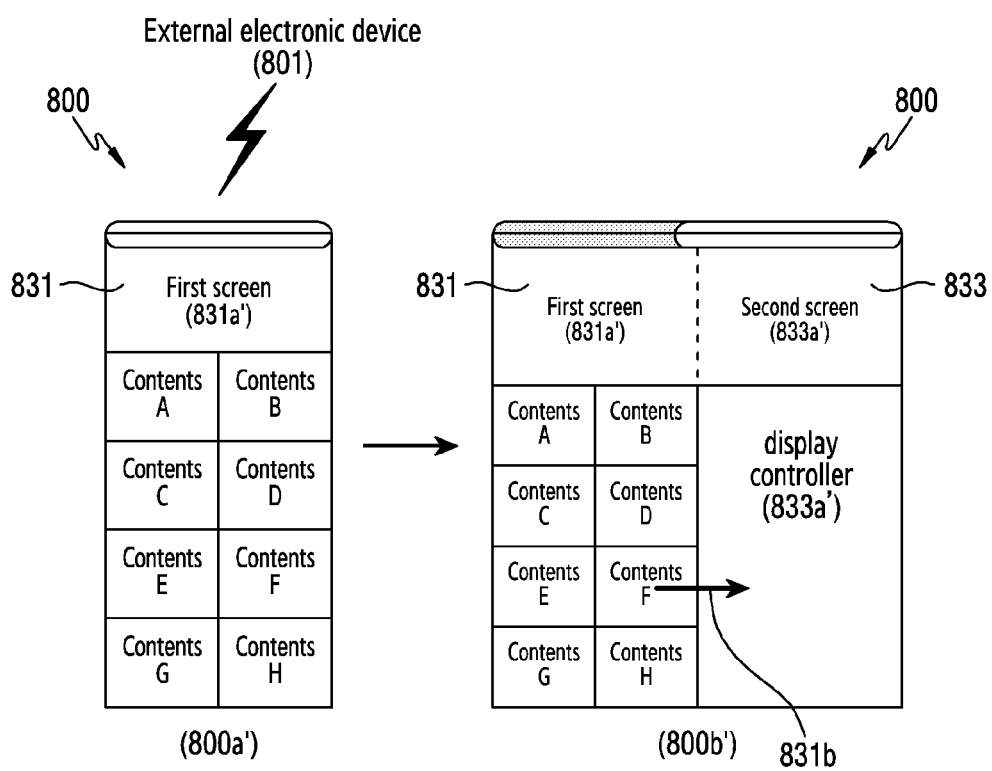
FIG. 8B illustrates a screen for controlling data execution, based on whether a display of an electronic device is expanded or not and whether the electronic device is connected to an external electronic device or not, according to an embodiment of the disclosure.

FIG. 8B illustrates a screen for controlling data execution, based on whether a display of an electronic device is expanded or not and whether the electronic device is connected to an external electronic device or not, according to an embodiment of the disclosure.

Referring to FIG. 8B, the electronic device 800 may display a screen in the first display region 831 and/or in the second display region 833, based on a first state 800a' or a second state 800b'.

Referring to the first state 800a', the electronic device 800 may display a first screen 831a' in the first display region 831 as a result of executing a first application. The first application may include a function of transmitting/receiving data (for example, contents), for example. In an embodiment of the disclosure, the electronic device 800 may identify whether or not a transition occurs from to the first state 800a' (for example, reduction state) to a second state 800b' (for example, expansion state) while the first screen 831a' is displayed in the first display region 831. In an embodiment of the disclosure, the electronic device 800 may be connected to an external electronic device 801. The external electronic device 801 may be an electronic device (for example, a PC) supporting a data transmitting/receiving function, for example.

Referring to the second state 800b', the electronic device 800 may display a first screen 831a' in the first display region 831 and may display a second screen 833a' in the second display region 833. The second screen 833a' may be a screen for controlling a data executing function that can be performed in the external electronic device 801, for example. In an embodiment of the disclosure, the electronic device 800 may transmit data displayed inside the first screen 831a' to the external electronic device 801 in response to an input (for example, drag and drop) interlinked from the first screen 831a' to the second screen 833a'. In an embodiment of the disclosure, the electronic device 800 may control data executed in the external electronic device 801 through the second screen 833a' while data transmitted from the electronic device 800 is executed in the external electronic device 801.

Figure 8C:
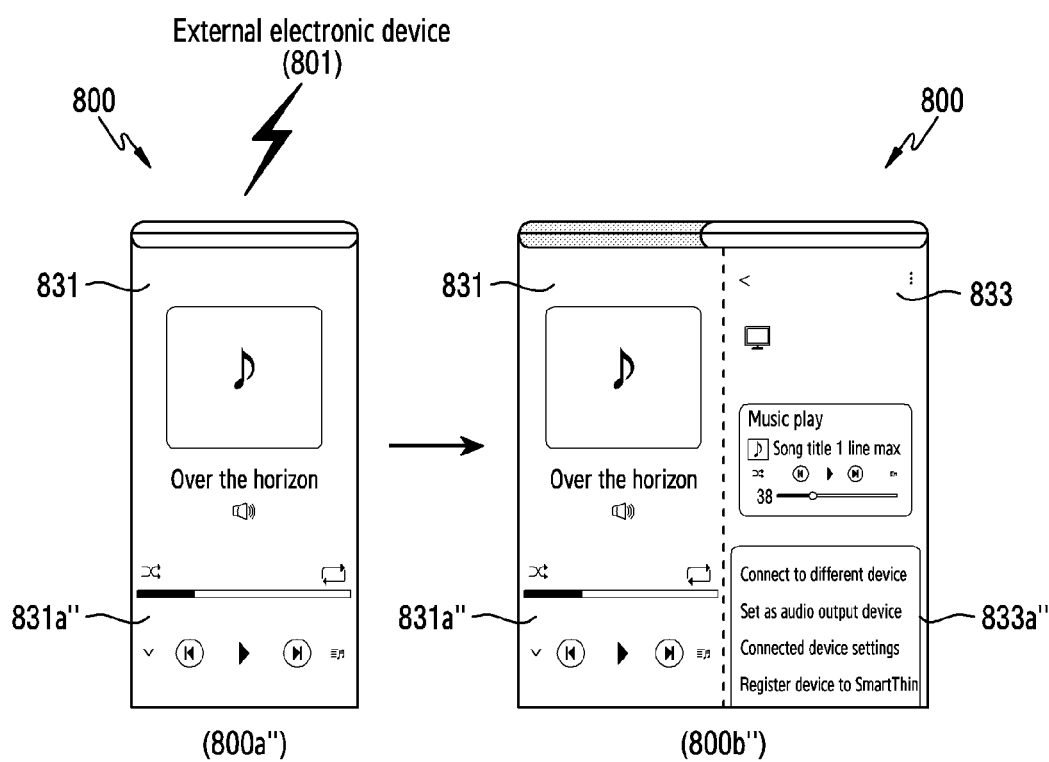
FIG. 8C illustrates a screen for controlling data execution, based on whether a display of an electronic device is expanded or not and whether the electronic device is connected to an external electronic device or not, according to an embodiment of the disclosure.

FIG. 8C illustrates a screen for controlling data execution, based on whether a display of an electronic device is expanded or not and whether the electronic device is connected to an external electronic device or not, according to an embodiment of the disclosure.

Referring to FIG. 8C, the electronic device 800 may display a screen in the first display region 831 and/or in the second display region 833, based on a first state 800a" or a second state 800b".

Referring to the first state 800a", the electronic device 800 may display a first screen 831a" in the first display region 831 as a result of executing a first application. The first application may include a function of transmitting/receiving data (for example, audio data), for example. In an embodiment of the disclosure, the electronic device 800 may identify whether or not a transition occurs from to the first state 800a" (for example, reduction state) to a second state 800b" (for example, expansion state) while the first screen 831a" is displayed in the first display region 831. In an embodiment of the disclosure, the electronic device 800 may be connected to an external electronic device 801. The external electronic device 801 may be an electronic device (for example, a speaker) supporting a data executing function, for example.

Referring to the second state 800*b*", the electronic device 800 may display a first screen 831*a*" in the first display region 831 and may display a second screen 833*a*" in the second display region 833. The second screen 833*a*" may be a screen for controlling a data executing function that can be performed in the external electronic device 801, for example. In an embodiment of the disclosure, the electronic device 800 may control data executed in the external electronic device 801 through the second screen 833*a*" while data displayed through the first screen 831*a*" is executed in the external electronic device 801.

Figure 9:
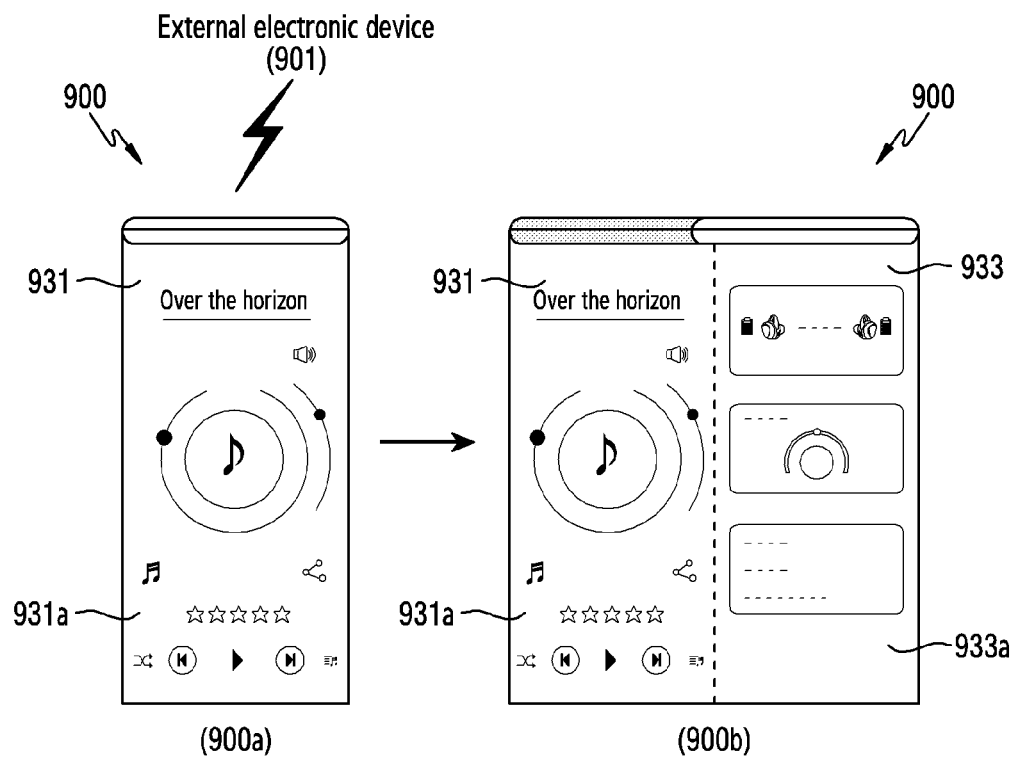
FIG. 9 illustrates a screen for controlling data execution, based on whether a display of an electronic device is expanded or not and whether the electronic device is connected to an external electronic device or not, according to an embodiment of the disclosure.

FIG. 9 illustrates a screen for controlling data execution, based on whether a display of an electronic device is expanded or not and whether the electronic device is connected to an external electronic device or not, according to an embodiment of the disclosure.

Referring to FIG. 9, an electronic device 900 may display a screen in a first display region 931 and/or in a second display region 933, based on a first state 900*a* or a second state 900*b*.

Referring to the first state 900*a*, the electronic device 900 may display a first screen 931*a* in the first display region 931 as a result of executing a first application. The first application may include a function of transmitting/receiving data (for example, audio data), for example. In an embodiment of the disclosure, the electronic device 900 may identify whether or not a transition occurs from to the first state 900*a* (for example, reduction state) to a second state 900*b* (for example, expansion state) while the first screen 931*a* is displayed in the first display region 931. In an embodiment of the disclosure, the electronic device 900 may be connected to an external electronic device 901. The external electronic device 901 may be an electronic device (for example, an earphone) supporting a data executing function, for example.

Referring to the second state 900*b*, the electronic device 900 may display a first screen 931*a* in the first display region 931 and may display a second screen 933*a* in the second display region 933. The second screen 933*a* may be a screen for controlling a data executing function that can be performed in the external electronic device 901, for example. In an embodiment of the disclosure, the electronic device 900 may control data executed in the external electronic device 901 through the second screen 933*a* while data displayed through the first screen 931*a* is executed in the external electronic device 901.

Figure 10:
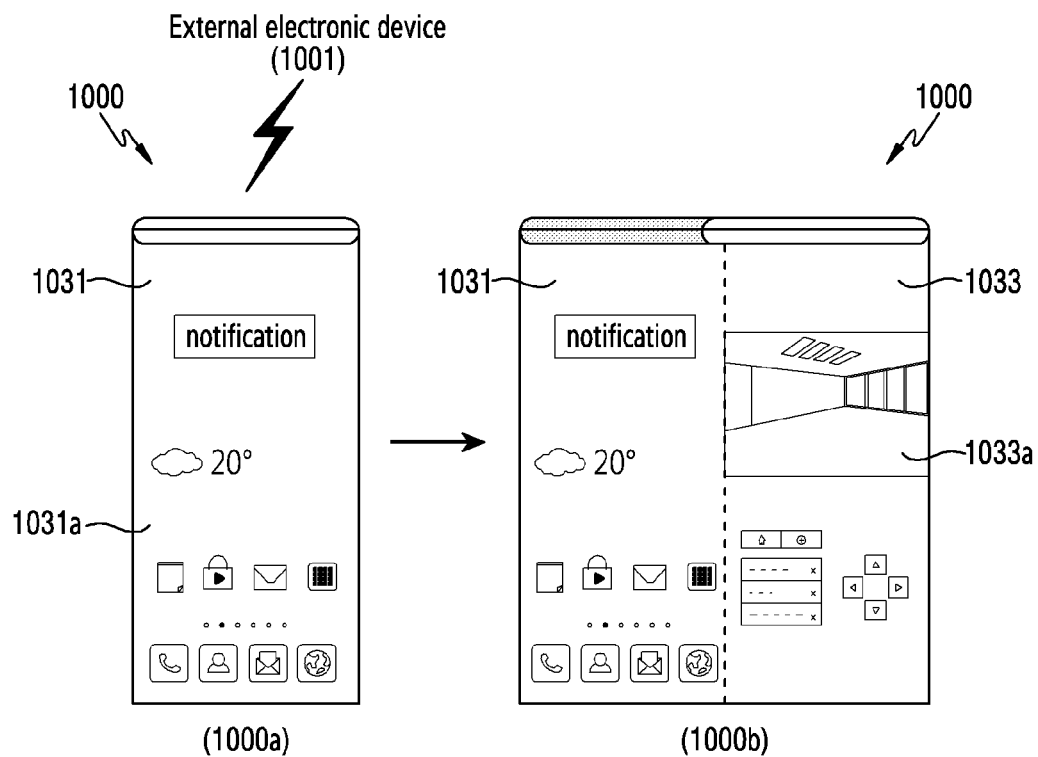
FIG. 10 illustrates a screen for identifying data acquired from an external electronic device, based on whether a display of an electronic device is expanded or not and whether the electronic device is connected to the external electronic device or not, according to an embodiment of the disclosure.

FIG. 10 illustrates a screen for identifying data acquired from an external electronic device, based on whether a display of an electronic device is expanded or not and whether the electronic device is connected to the external electronic device or not, according to an embodiment of the disclosure.

Referring to FIG. 10, an electronic device 1000 may display a screen in a first display region 1031 and/or in a second display region 1033, based on a first state 1000*a* or a second state 1000*b*.

Referring to the first state 1000*a*, the electronic device 1000 may display a first screen 1031*a* in the first display region 1031 as a result of executing a first application. The first application may include a function of notifying of data (for example, captured images) received from an external electronic device 1001, for example. In an embodiment of the disclosure, the electronic device 1000 may identify whether or not a transition occurs from to the first state 1000*a* (for example, reduction state) to a second state 1000*b* (for example, expansion state) while the first screen 1031*a* is displayed in the first display region 1031. In an embodiment of the disclosure, the electronic device 1000 may be connected to an external electronic device 1001. The external electronic device 1001 may be an electronic device (for example, a CCTV) supporting a data acquiring function, for example.

Referring to the second state 1000*b*, the electronic device 1000 may display a first screen 1031*a* in the first display region 1031 and may display a second screen 1033*a* in the second display region 1033. The second screen 1033*a* may be a screen for controlling a data acquiring function that can be performed in the external electronic device 1001, for example. In an embodiment of the disclosure, the electronic device 1000 may display a second screen 1033*a* in the second display region 1033, based on data acquired from the external electronic device 1001. The second screen 1033*a* may be, for example, a screen for displaying images that have been captured (or currently being captured) through the external electronic device 1001.

Figure 11:
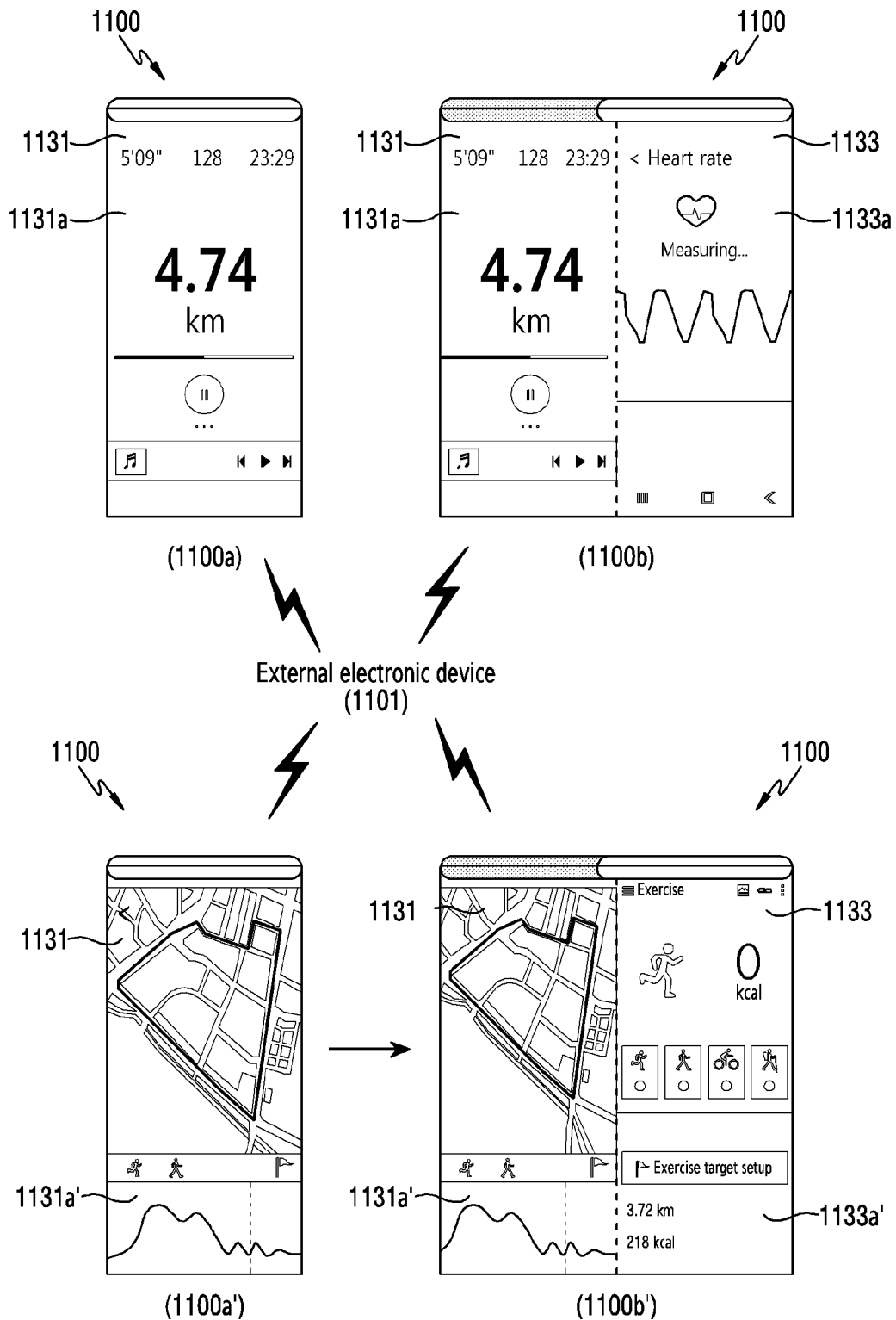
FIG. 11 illustrates a screen for identifying data acquired from an external electronic device, based on whether a display of an electronic device is expanded or not and whether the electronic device is connected to the external electronic device or not, according to an embodiment of the disclosure.

FIG. 11 illustrates a screen for identifying data acquired from an external electronic device, based on whether a display of an electronic device is expanded or not and whether the electronic device is connected to the external electronic device or not, according to an embodiment of the disclosure.

Referring to FIG. 11, an electronic device 1100 may display a screen in a first display region 1131 and/or in a second display region 1133, based on a first state 1100*a* or a second state 1100*b*.

Referring to the first state 1100*a*, the electronic device 1100 may display a first screen 1131*a* in the first display region 1131 as a result of executing a first application. The first application may include a function (for example, running time measurement) that can be executed by using a function of an external electronic device 1001, for example. In an embodiment of the disclosure, the electronic device 1100 may identify whether or not a transition occurs from to the first state 1100*a* (for example, reduction state) to a second state 1100*b* (for example, expansion state) while the first screen 1131*a* is displayed in the first display region 1131. In an embodiment of the disclosure, the electronic device 1100 may be connected to an external electronic device 1101. The external electronic device 1101 may be an electronic device (for example, a wearable device) supporting a data acquiring function, for example.

Referring to the second state 1100*b*, the electronic device 1100 may display a first screen 1131*a* in the first display region 1131 and may display a second screen 1133*a* in the second display region 1133. The second screen 1133*a* may be a screen for controlling a data acquiring function that can be performed in the external electronic device 1101, for example. In an embodiment of the disclosure, based on biometric data acquired from the external electronic device 1101 while the user continues exercise (for example, running), the electronic device 1100 may display a second screen 1133*a* for identifying the acquired biometric data in the second display region 1133. Referring to FIG. 11, the electronic device 1100 may display a screen in the first display region 1131 and/or in the second display region 1133, based on a first state 1100*a*' or a second state 1100*b*'.

Referring to the first state 1100*a*', the electronic device 1100 may display a first screen 1131*a*' in the first display region 1131 as a result of executing a first application. The first application may include a function (for example, identifying a path of movement) that can be executed by using a function of an external electronic device 1101, for example. In an embodiment of the disclosure, the electronic device 1100 may identify whether or not a transition occurs from to the first state 1100a' (for example, reduction state) to a second state 1100b '(for example, expansion state) while the first screen 1131a' is displayed in the first display region 1131. In an embodiment of the disclosure, the electronic device 1100 may be connected to an external electronic device 1101. The external electronic device 1101 may be an electronic device (for example, a wearable device) supporting a data acquiring function, for example.

Referring to the second state 1100b,' the electronic device 1100 may display a first screen 1131a' in the first display region 1131 and may display a second screen 1133a' in the second display region 1133. The second screen 1133a' may be a screen for controlling a data acquiring function that can be performed in the external electronic device 1101, for example. In an embodiment of the disclosure, based on biometric data acquired from the external electronic device 1101 after the user has ended exercise (for example, running), the electronic device 1100 may display a second screen 1133a' including data (for example, calorie consumption based on the number of steps) that can be derived from the acquired biometric data, in the second display region 1133.

Figure 12:
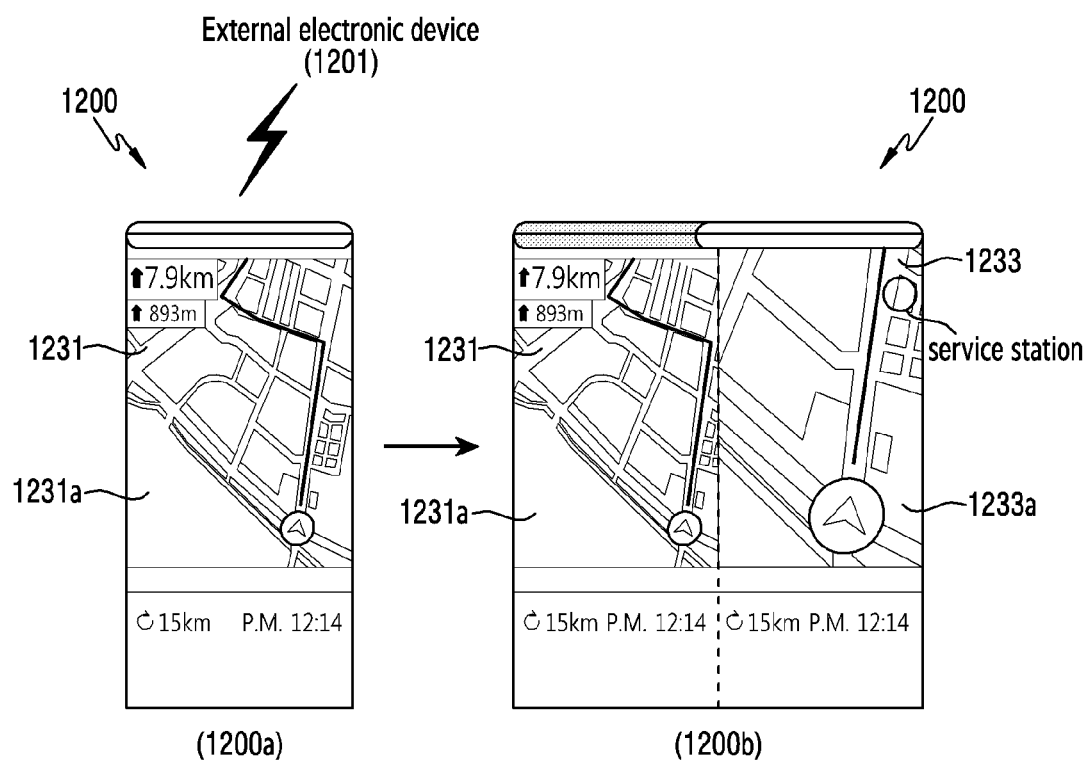
FIG. 12 illustrates a screen for identifying data acquired from an external electronic device, based on whether a display of an electronic device is expanded or not and whether the electronic device is connected to the external electronic device or not, according to an embodiment of the disclosure.

FIG. 12 illustrates a screen for identifying data acquired from an external electronic device, based on whether a display of an electronic device is expanded or not and whether the electronic device is connected to the external electronic device or not, according to an embodiment of the disclosure.

Referring to FIG. 12, an electronic device 1200 may display a screen in a first display region 1231 and/or in a second display region 1233, based on a first state 1200a or a second state 1200b.

Referring to the first state 1200a, the electronic device 1200 may display a first screen 1231a in the first display region 1231 as a result of executing a first application. The first application may include a data (for example, position data) acquiring function, for example. In an embodiment of the disclosure, the electronic device 1200 may identify whether or not a transition occurs from to the first state 1200a (for example, reduction state) to a second state 1200b (for example, expansion state) while the first screen 1231a is displayed in the first display region 1231. In an embodiment of the disclosure, the electronic device 1200 may be connected to an external electronic device 1201. The external electronic device 1201 may be an electronic device (for example, a vehicle) supporting a data (for example, the amount of remaining fuel) acquiring function, for example.

Referring to the second state 1200b, the electronic device 1200 may display a first screen 1231a in the first display region 1231 and may display a second screen 1233a in the second display region 1233. The second screen 1233a may be a screen for controlling a data acquiring function that can be performed in the external electronic device 1201, for example. In an embodiment of the disclosure, based on data received from the external electronic device 1201, the electronic device 1200 may display a second screen 1233a related to a function of the first application in the second display region 1233. The second screen 1233a may be, for example, a screen for displaying the location of fuel charging stations positioned along the current path of movement, based on the amount of remaining fuel measured (or currently measured) by the external electronic device 1201.

Figure 13:
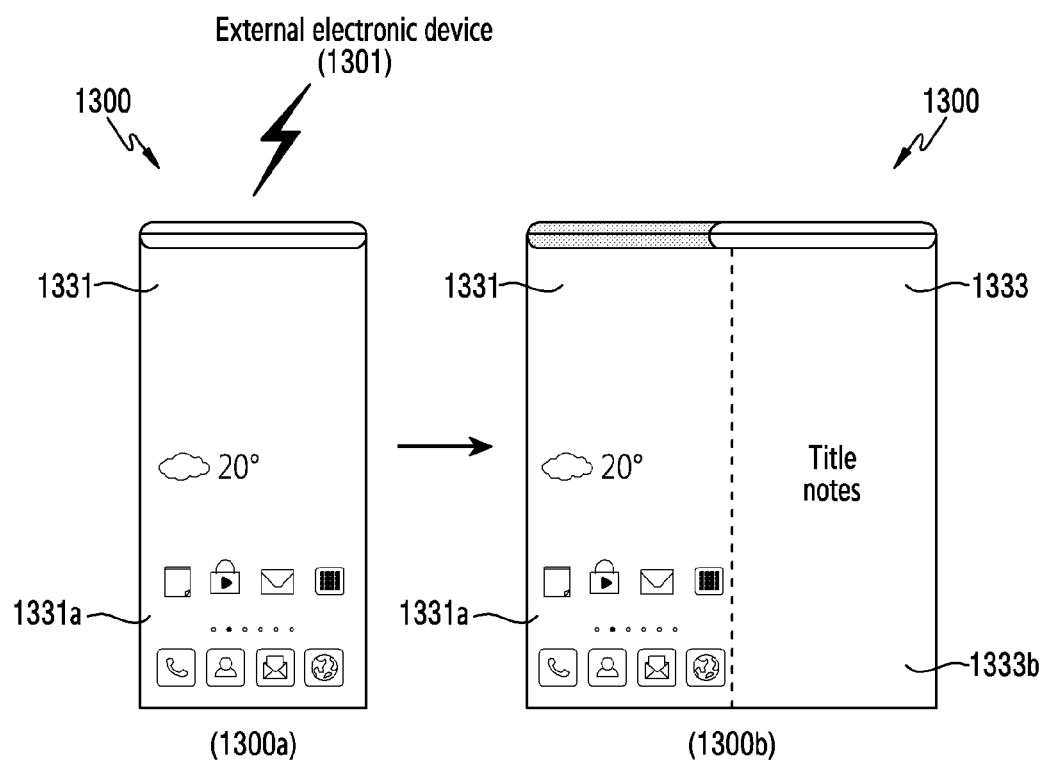
FIG. 13 illustrates a screen for executing a function that can be performed in an external electronic device, based on whether a display of an electronic device is expanded or not and whether the electronic device is connected to the external electronic device or not, according to an embodiment of the disclosure.

FIG. 13 illustrates a screen for executing a function that can be performed in an external electronic device, based on whether a display of an electronic device is expanded or not and whether the electronic device is connected to the external electronic device or not, according to an embodiment of the disclosure.

Referring to FIG. 13, an electronic device 1300 may display a screen in a first display region 1331 and/or in a second display region 1333, based on a first state 1300a or a second state 1300b.

Referring to the first state 1300a, the electronic device 1300 may display a first screen 1331a in the first display region 1331. In an embodiment of the disclosure, the electronic device 1300 may identify whether or not a transition occurs from to the first state 1300a (for example, reduction state) to a second state 1300b (for example, expansion state) while the first screen 1331a is displayed in the first display region 1331. In an embodiment of the disclosure, the electronic device 1300 may be connected to an external electronic device 1301. The external electronic device 1301 may be an electronic device (for example, a stylus pen) configured to transmit data (for example, a command) to the electronic device 1300 such that a function corresponding to the data is executed, for example.

Referring to the second state 1300b, the electronic device 1300 may display a first screen 1331a in the first display region 1331 and may display a second screen 1333a in the second display region 1333. The second screen 1333a may be a screen for executing a function corresponding to the type of an input received from the external electronic device 1301, for example. In an embodiment of the disclosure, in order to respond to a signal (for example, a command) transmitting function that can be performed in the external electronic device 1301, the electronic device 1300 may display a second screen 1333a for executing a function (for example, a memo input function or a camera function) that can be performed in the electronic device 1300 in the second screen 1333a, based on the type of the received input.

Figure 14:
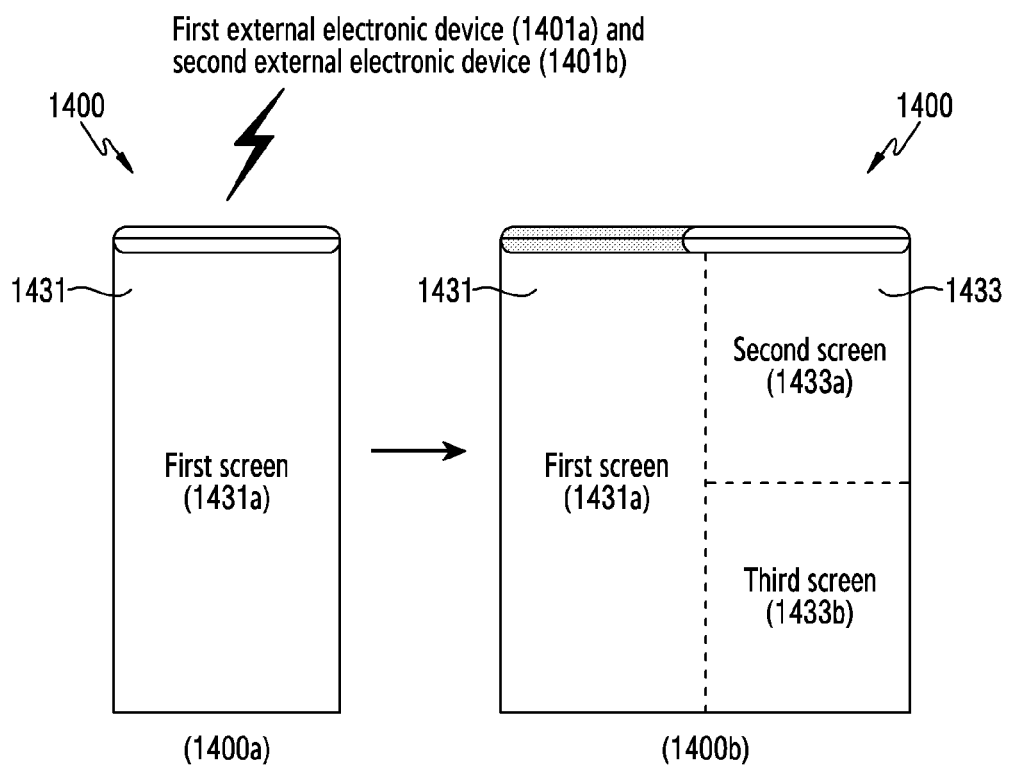
FIG. 14 illustrates split screens displayed in a display region, based on whether a display of an electronic device is expanded or not and whether the electronic device is connected to multiple external electronic devices or not, according to an embodiment of the disclosure.

FIG. 14 illustrates split screens displayed in a display region, based on whether a display of an electronic device is expanded or not and whether the electronic device is connected to multiple external electronic devices or not, according to an embodiment of the disclosure.

Referring to FIG. 14, an electronic device 1400 may display a screen in a first display region 1431 and/or in a second display region 1433, based on a first state 1400a or a second state 1400b.

Referring to the first state 1400a, the electronic device 1400 may display a first screen 1431a in the first display region 1431. In an embodiment of the disclosure, the electronic device 1400 may identify whether or not a transition occurs from to the first state 1400a (for example, reduction state) to a second state 1400b (for example, expansion state) while the first screen 1431a is displayed in the first display region 1431. In an embodiment of the disclosure, the electronic device 1400 may be connected to multiple external electronic devices 1401a and 1401b.

Referring to the second state 1400b, the electronic device 1400 may display a first screen 1431a in the first display region 1431 and may display a second screen 1433a and a third screen 1433b in the second display region 1433. At least one of second screen 1433a and the third screen 1433b may be a screen related to a function that can be performed in the external electronic device 1401a or 1401b and a function of a first application, for example.

Figure 15:
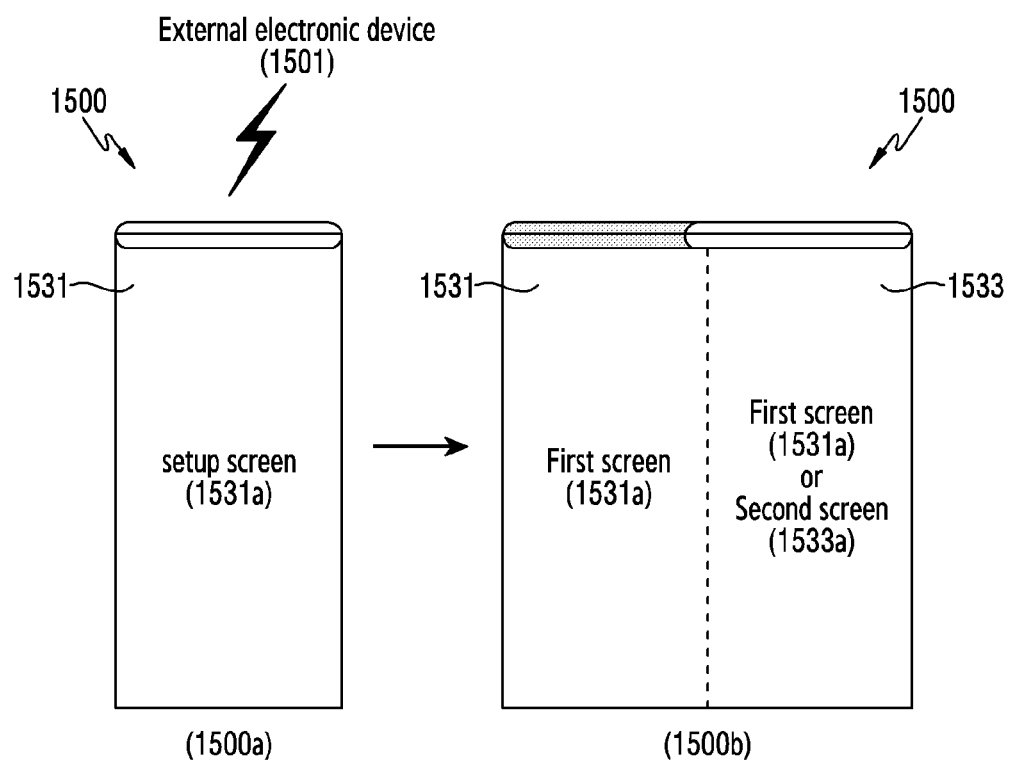
FIG. 15 illustrates split screens displayed in a display region, based on whether a display of an electronic device is expanded or not and whether the electronic device is connected to multiple external electronic devices or not, according to an embodiment of the disclosure.

FIG. 15 illustrates split screens displayed in a display region, based on whether a display of an electronic device is expanded or not and whether the electronic device is connected to multiple external electronic devices or not, according to an embodiment of the disclosure.

Referring to FIG. 15, an electronic device 1500 may display a screen in a first display region 1531 and/or in a second display region 1533, based on a first state 1500a or a second state 1500b, according to a designated setup.

Referring to the first state 1500a, the electronic device 1500 may display a first screen 1531a in the first display region 1531. In an embodiment of the disclosure, the electronic device 1500 may identify whether or not a transition occurs from to the first state 1500a (for example, reduction state) to a second state 1500b (for example, expansion state) while the first screen 1531a is displayed in the first display region 1531. In an embodiment of the disclosure, the electronic device 1500 may be connected to an external electronic device 1501. In an embodiment of the disclosure, the electronic device 1500 may determine whether or not to display split screens, based on whether or not the electronic device 1500 is connected to the external electronic device 1501, and based on whether or not a transition occurs from the first state 1500a to the second state 1500b.

Referring to the second state 1500b, the electronic device 1500 may display a screen in the first display region 1531 and in the second display region 1533, based on whether or not split screen display has been set. In an embodiment of the disclosure, if screen splitting has been set, the electronic device 1500 may display an expanded first screen 1531a in the first display region 1531 and in the second display region 1533. In an embodiment of the disclosure, if screen splitting has not been set, the electronic device 1500 may display a first screen 1531a in the first display region 1531 and may display a second screen 1533a in the second display region 1533. The second screen 1533a may be a screen related to a function that can be performed in the external electronic device 1501 and a function of a first application, for example.

Figure 16:
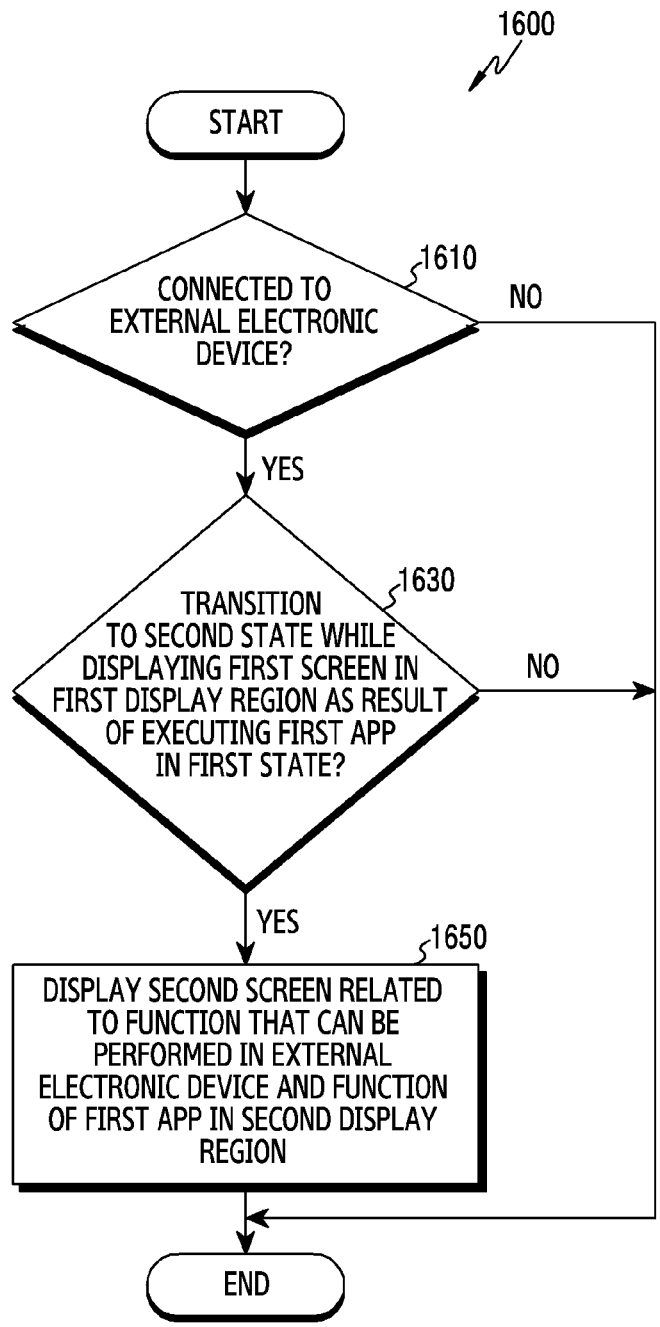
FIG. 16 is a flowchart illustrating a method for controlling an expandable display according to an embodiment of the disclosure.

FIG. 16 is a flowchart illustrating a method 1600 for controlling an expandable display according to an embodiment of the disclosure.

Referring to FIG. 16, an electronic device (for example, the electronic device 500 in FIG. 5) may perform operations 1610 to 1650 to predict the user's intent and to accordingly display split screens in a display region (for example, the first display region 531 and the second display region 533 in FIG. 5), based on whether the electronic device is connected to an external electronic device (for example, the external electronic device 501 in FIG. 5) or not and based on whether a display (for example, the display 530 in FIG. 5) is expanded or not.

Referring to operation 1610, the electronic device 500 may identify whether or not the same is connected to an external electronic device 501. For example, the electronic device 500 may be connected to an external electronic device 501 through a communication channel established by using a communication circuit (for example, the communication circuit 510 in FIG. 5). In an embodiment of the disclosure, when connected to the external electronic device 501, the electronic device 500 may perform operation 1630. In an embodiment of the disclosure, when not connected to the external electronic device 501, the electronic device 500 may end the operation or repeat operation 1610.

Referring to operation 1630, the electronic device 500 may identify whether or not a transition occurs from a first state to a second state as a result of expansion of the display 530 while a first screen is displayed in the first display region 531 as a result of executing a first application in the first state. In an embodiment of the disclosure, the electronic device 500 may perform operation 1650 if a transition occurs from the first state to the second state while the first screen is displayed in the first display region 531. In an embodiment of the disclosure, the electronic device 500 may end the operation or repeat operation 1630 if no transition occurs from the first state to the second state while the first screen is displayed in the first display region 531. In various embodiments of the disclosure, the electronic device 500 may perform operation 1430 before operation 1610.

Referring to operation 1650, when connected to an external electronic device 501, and when a transition has occurred from the first state to the second state, the electronic device 500 may display a screen related to a function that can be performed in the external electronic device 501 and a function of a first application in the second display region 533. In an embodiment of the disclosure, the electronic device 500 may display a second screen in the second display region 533 with regard to each function that can be performed in the external electronic device 501, based on whether or not the electronic device 500 is connected to an external electronic device 501, and based on whether or not a transition occurs from the first state to the second as a result of expansion of the display 530. In an embodiment of the disclosure, the function that can be performed in the external electronic device 501 may be at least one of a data transmitting/receiving function, a data executing function, and/or a data acquiring function. The second screen displayed in the second display region 533 according to each function described above may be associated with the function of the first application as well.

Figure 17:
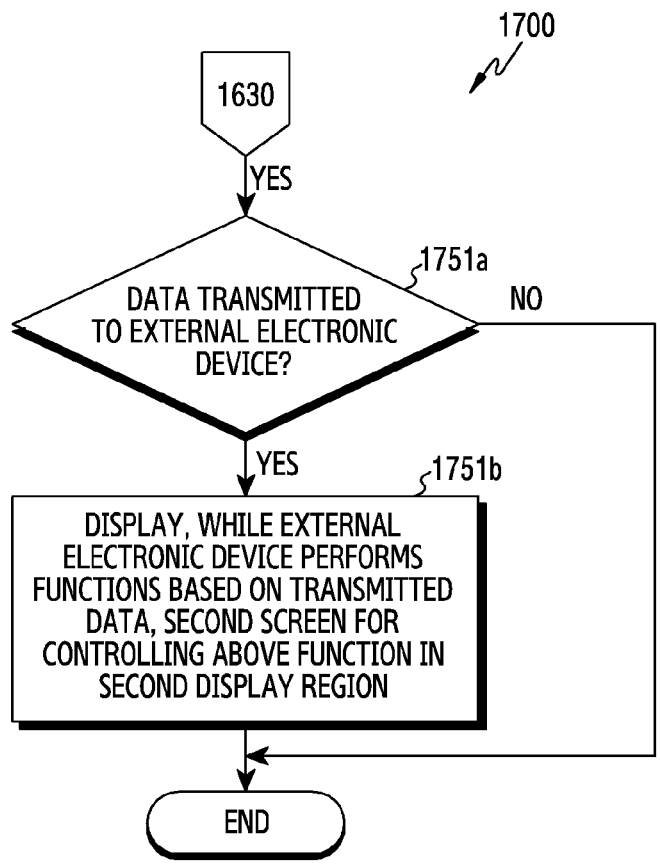
FIG. 17 is a flowchart illustrating a method for controlling a function that can be performed in an external electronic device, based on data transmitted to the external electronic device, according to an embodiment of the disclosure.

FIG. 17 is a flowchart 1700 illustrating a method for controlling a function that can be performed in an external electronic device, based on data transmitted to the external electronic device, according to an embodiment of the disclosure.

Referring to FIG. 17, the electronic device 500 may perform operations 1751a and 1751b to display split screens related to a function that can be performed in the external electronic device 501 in a display region (for example, the first display region 531 and the second display region 533), based on whether or not the electronic device 500 is connected to the external electronic device 501, and based on whether the display 530 is expanded or not. In an embodiment of the disclosure, the electronic device 500 may perform operations 1751a and 1751b after operation 1630 in FIG. 16. In an embodiment of the disclosure, the electronic device 500 may perform operations 1751a and 1751b so as to replace (or specify) operation 1650 in FIG. 16.

Referring to operation 1751a, the electronic device 500 may identify whether or not data has been transmitted to the external electronic device 501. For example, the electronic device 500 may transmit data to the external electronic device 501 by using a function of a first application such that the external electronic device 501 performs a function (for example, data transmission/reception, data execution), based on data transmitted from the electronic device 500.

Referring to operation 1751b, the electronic device 500 may display a second screen for controlling a function that can be performed in the external electronic device 501, based on data transmitted from the electronic device 500, in the second display region 533. In an embodiment of the disclosure, the electronic device 500 may control the function that can be performed in the external electronic device 501, based on the second screen.

Figure 18:
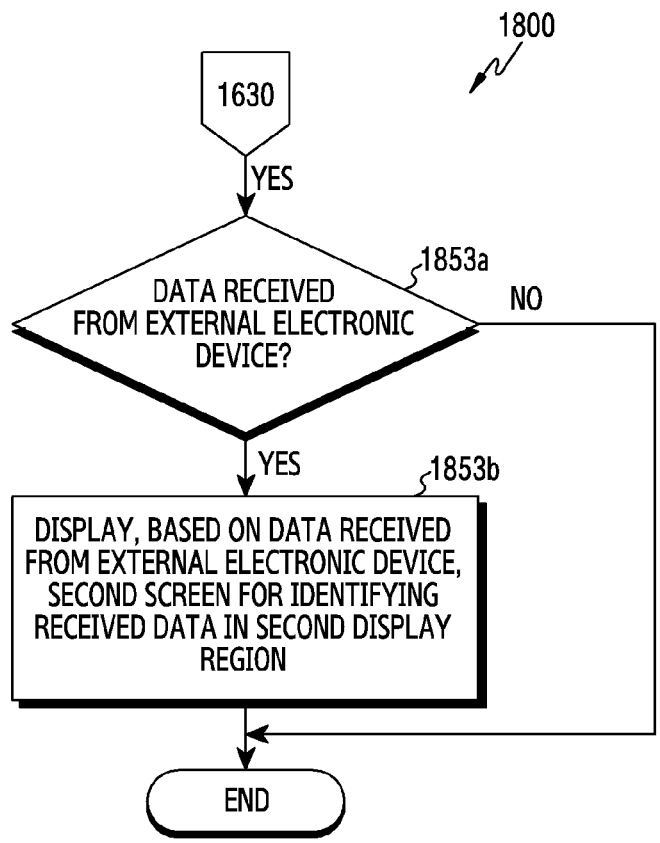
FIG. 18 is a flowchart illustrating a method for identifying a function that can be performed in an external electronic device, based on data received from the external electronic device, according to an embodiment of the disclosure.

FIG. 18 is a flowchart 1800 illustrating a method for identifying a function that can be performed in an external electronic device, based on data received from the external electronic device, according to an embodiment of the disclosure.

Referring to FIG. 18, the electronic device 500 may perform operations 1853a and 1853b to display split screens related to a function that can be performed in the external electronic device 501 in a display region (for example, the first display region 531 and the second display region 533), based on whether or not the electronic device 500 is connected to the external electronic device 501, and based on whether the display 530 is expanded or not. In an embodiment of the disclosure, the electronic device 500 may perform operations 1853a and 1853b after operation 1630 in FIG. 16. In an embodiment of the disclosure, the electronic device 500 may perform operations 1853a and 1853b so as to replace (or specify) operation 1650 in FIG. 16.

Referring to operation 1853a, the electronic device 500 may identify whether or not data has been received from the external electronic device 501. For example, the electronic device 500 may receive data from the external electronic device 501 by using a function of a first application in order to identify a function (for example, data acquisition) that can be performed in the external electronic device 501.

Referring to operation 1853b, the electronic device 500 may display a second screen for identifying a function that can be performed in the external electronic device 501, based on data received from the electronic device 500, in the second display region 533. In an embodiment of the disclosure, the electronic device 500 may display a second screen related to an additional function (for example, displaying the heart rate when measuring the running time) of the first application in the second display region 533, based on the acquire data, in order to identify data received from the external electronic device 501.

Figure 19:
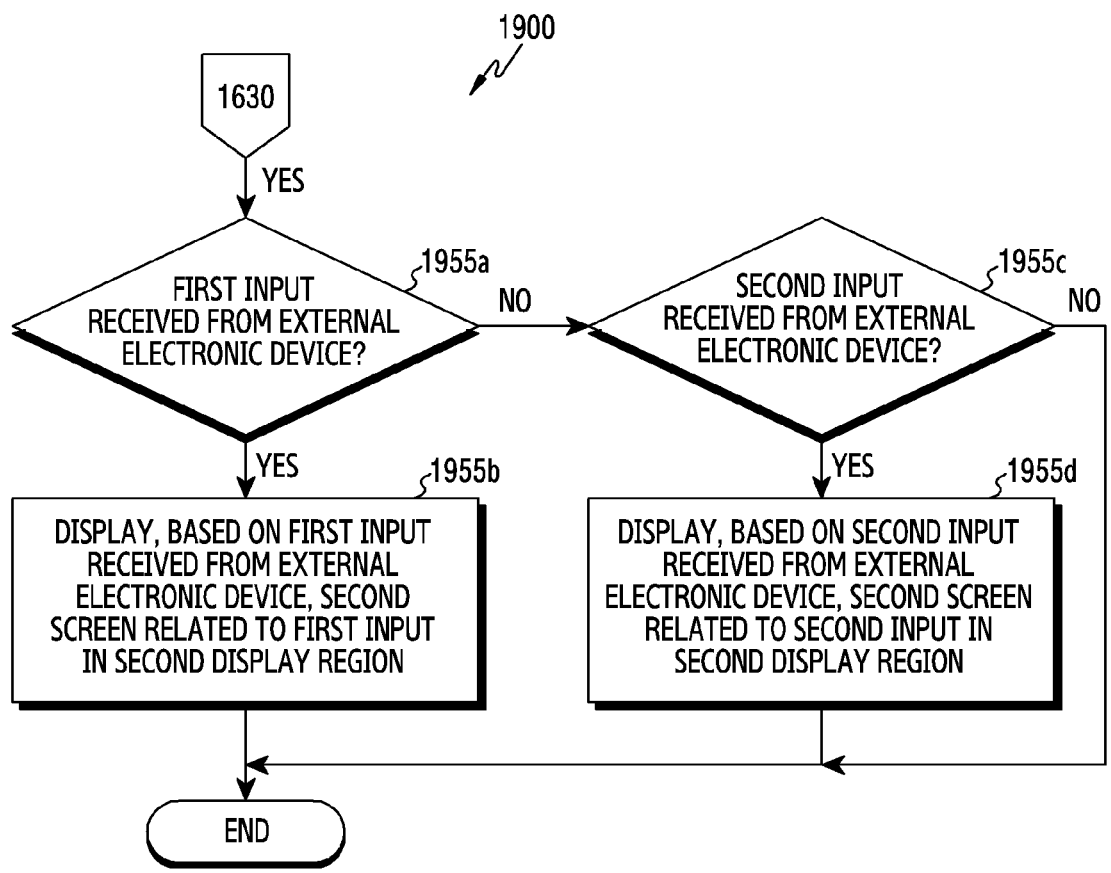
FIG. 19 is a flowchart illustrating a method for executing a function that can be performed in an external electronic device, based on the type of an input received from the external electronic device, according to an embodiment of the disclosure.

FIG. 19 is a flowchart 1900 illustrating a method for executing a function that can be performed in an external electronic device, based on the type of an input received from the external electronic device, according to an embodiment of the disclosure.

Referring to FIG. 19, the electronic device 500 may perform operations 1955a to 1955d to display split screens related to a function that can be performed in the external electronic device 501 in a display region (for example, the first display region 531 and the second display region 533), based on whether or not the electronic device 500 is connected to the external electronic device 501, and based on whether the display 530 is expanded or not. In an embodiment of the disclosure, the electronic device 500 may perform operations 1955a to 1955d after operation 1630 in FIG. 16. In an embodiment of the disclosure, the electronic device 500 may perform operations 1955a to 1955d so as to replace (or specify) operation 1650 in FIG. 16.

Referring to operation 1955a, the electronic device 500 may identify whether or not a first input (for example, a command) has been received from the external electronic device 501. For example, the electronic device 500 may receive a first input from the external electronic device 501 in order to execute a function corresponding to the first input, based on the first input received from the external electronic device 501. In an embodiment of the disclosure, the electronic device 500 may perform operation 1955b upon receiving the first input from the external electronic device 501. In an embodiment of the disclosure, the electronic device 500 may perform operation 1955c upon receiving no first input from the external electronic device 501.

Referring to operation 1955b, in order to respond to the first input received from the external electronic device 501, the electronic device 500 may display a second screen for executing a function (for example, a camera function) that can be performed in the electronic device 500, based on the first input, in the second display region 533.

Referring to operation 1955c, the electronic device 500 may identify whether or not a second input (for example, a command) has been received from the external electronic device 501. For example, the electronic device 500 may receive a second input from the external electronic device 501 in order to execute a function corresponding to the second input, based on the second input received from the external electronic device 501. In an embodiment of the disclosure, the electronic device 500 may perform operation 1955d upon receiving the second input from the external electronic device 501. In an embodiment of the disclosure, the electronic device 500 may end operation 1955c or repeatedly perform operation 1955a upon receiving no second input from the external electronic device 501.

Referring to operation 1955d, in order to respond to the second input received from the external electronic device 501, the electronic device 500 may display a second screen for executing another function (for example, a memo input function) that can be performed in the electronic device 500, based on the second input, in the second display region 533.

Figure 20:
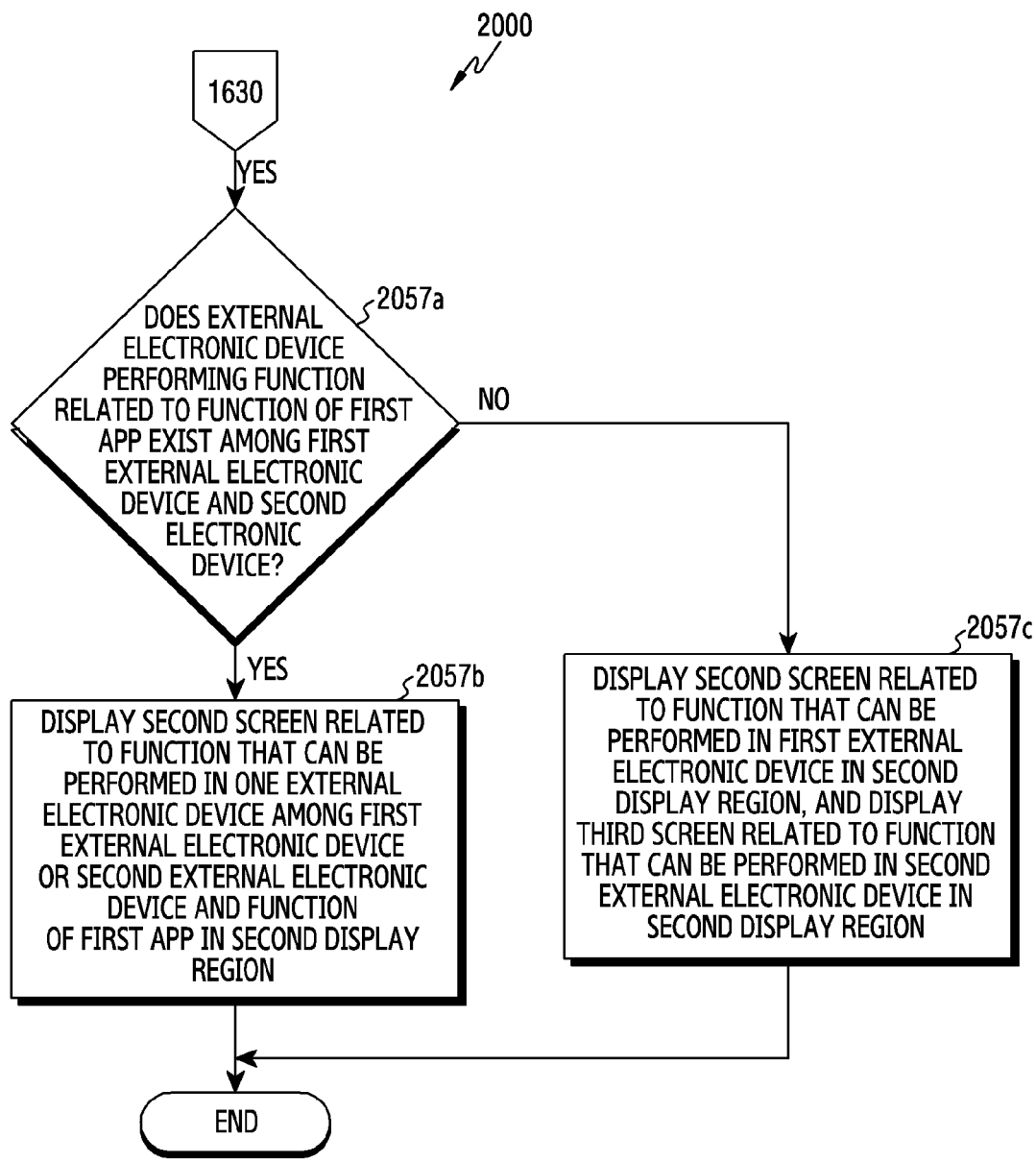
FIG. 20 is a flowchart illustrating a method for controlling an expandable display, based on whether connected to multiple external electronic devices or not according to an embodiment of the disclosure.

FIG. 20 is a flowchart 2000 illustrating a method for controlling an expandable display, based on whether connected to multiple external electronic devices or not according to an embodiment of the disclosure.

Referring to FIG. 20, the electronic device 500 may perform operations 2057a to 2057c to display split screens related to a function that can be performed in the multiple external electronic device 501 in a display region (for example, the first display region 531 and the second display region 533), based on whether or not the electronic device 500 is connected to the multiple external electronic devices 501, and based on whether the display 530 is expanded or not. In an embodiment of the disclosure, the electronic device 500 may perform operations 2057a to 2057c after operation 1630 in FIG. 16. In an embodiment of the disclosure, the electronic device 500 may perform operations 2057a to 2057c so as to replace (or specify) operation 1650 in FIG. 16.

Referring to operation 2057a, the electronic device 500 may identify an external electronic device 501 which performs a function related to a function of a first application among a first external electronic device and a second external electronic device. For example, when an execution screen of a first application that supports a data transmitting/receiving function is displayed in the first display region 531, the electronic device 500 may identify whether or not an external electronic device 501 that performs a function related to the data transmitting/receiving function exists. In an embodiment of the disclosure, the electronic device 500 may perform operation 2057b upon identifying the existence of an external electronic device 501 that performs a function related to the function of the first application. In an embodiment of the disclosure, the electronic device 500 may perform operation 2057c upon failing to identify the existence of an external electronic device 501 that performs a function related to the function of the first application.

Referring to operation 2057b, the electronic device 500 may display a second screen related to a function that can be performed in the external electronic device 501 that performs a function related to the function of the first application, in the second display region 533. The second screen may be, for example, a screen related to a function that can be performed in the external electronic device 501 and the function of the first application.

Referring to operation 2057*c*, the electronic device 500 may display a second screen related to a function that can be performed in the first external electronic device, in the second display region 533. In an embodiment of the disclosure, the electronic device 500 may display a third screen related to a function that can be performed in the second external electronic device, in the second display region 533. In an embodiment of the disclosure, the electronic device 500 may split the second display region 533 into multiple regions and may display a second screen and a third screen in the second display region 533 that has been split.

According to various embodiments of the disclosure, an electronic device (for example, the electronic device 500 in FIG. 5) may include a display (for example, the display 530 in FIG. 5) configured to display a screen, based on a first state (for example, the first state 600*a* in FIG. 6) in which a screen is displayed in a first display region (for example, the first display region 531 in FIG. 1) or a second state (for example, the second state 600*b* in FIG. 6) in which a screen is displayed in the first display region 531 and in a second display region (for example, the second display region 533 in FIG. 5) expanded from the first display region 531, a communication circuit (for example, the communication circuit 510 in FIG. 5), and a processor (for example, the processor 550 in FIG. 5) electrically connected to the display 530 and the communication circuit 510. The processor 550 may be configured to identify whether or not connection to an external electronic device (for example, the external electronic device 601 in FIG. 6) exists through the communication circuit 510, identify whether or not a transition occurs from the first state 600*a* to the second state 600*b* while a first screen (for example, the first screen 631*a* in FIG. 6) is displayed in the first display region 531 as a result of execution of a first application, and display a second screen (for example, the second screen 633*a* in FIG. 6) related to a function that can be performed in the external electronic device 601 and a function of the first application in the second display region 533, based on whether or not connection to the external electronic device 601 exists, and based on whether or not a transition occurs from the first state 600*a* to the second state 600*b*.

According to various embodiments of the disclosure, the processor 550 may be configured to display a second screen 633*a* for controlling a data transmitting/receiving function that can be performed in the external electronic device 601, in the second display region 533.

According to various embodiments of the disclosure, processor 550 may be configured to transmit data to the external electronic device 601 or receive data from the external electronic device 601 by using a function of the first application such that the external electronic device 601 performs the data transmitting/receiving function.

According to various embodiments of the disclosure, the processor 550 may be configured to display a second screen 633*a* for controlling a data executing function that can be performed in the external electronic device 601, in the second display region 533.

According to various embodiments of the disclosure, the processor 550 may be configured to transmit data to the external electronic device 601 by using a function of the first application such that the external electronic device 601 performs the data executing function.

According to various embodiments of the disclosure, the processor 550 may be configured to display a second screen 633*a* for identifying a data acquiring function that can be performed in the external electronic device 601, in the second display region 533.

According to various embodiments of the disclosure, the processor 550 may be configured to display, in order to identify data acquired from the external electronic device 601, a second screen 633*a* related to a function of the first application, based on the acquired data, in the second display region 533.

According to various embodiments of the disclosure, the processor 550 may be configured to identify the type of an input received from the external electronic device 601, and display, based on the identified type of the input, a second screen 633*a* on which a function corresponding to the identified type of the input is executed, in the second display region 533.

According to various embodiments of the disclosure, the processor 550 may be configured to identify, when connected to multiple external electronic devices (for example, the first external electronic device 1401*a* and the second external electronic device 1401*b* in FIG. 14) through the communication circuit 510, an external electronic device 1401*a* or 1401*b* that performs a function related to a function of the first application among the multiple external electronic devices 1401*a* and 1401*b*, and display a second screen 633*a* related to a function that can be performed in the identified external electronic device 1401*a* or 1401*b* and a function of the first application in the second display region 533.

According to various embodiments of the disclosure, the second screen 633*a* may be a screen resulting from execution of a second application related to a function of the first application and a function that can be performed in the external electronic device 601.

According to various embodiments of the disclosure, a method for controlling an expandable display may include an operation (for example, operation 1610 in FIG. 16) of identifying whether or not connection to an external electronic device 601 exists through a communication circuit 510, an operation (for example, operation 1630 in FIG. 16) of identifying, while a first screen 631*a* is displayed in a first display region 531 of a display 530 as a result of execution of a first application, whether or not a transition occurs from a first state 600*a* in which a screen is displayed in a first display region 531 to a second state 600*b* in which a screen is displayed in the first display region 531 and in a second display region 633 expanded from the first display region 531, and an operation (for example, operation 1650 in FIG. 16) of displaying a second screen 633*a* related to a function that can be performed in the external electronic device 601 and a function of the first application in the second display region 533, based on whether or not connection to the external electronic device 601 exists, and based on whether or not a transition occurs from the first state 600*a* to the second state 600*b*.

According to various embodiments of the disclosure, in the operation (operation 1650) of displaying a second screen 633*a* in the second display region 533, a second screen 633*a* for controlling a data transmitting/receiving function that can be performed in the external electronic device 601 may be displayed in the second display region 533.

According to various embodiments of the disclosure, in the operation (operation 1650) of displaying a second screen 633*a* in the second display region 533, data may be transmitted to the external electronic device 601, or data may be received from the external electronic device 601 by using a function of the first application such that the external electronic device 601 performs the data transmitting/receiving function.

According to various embodiments of the disclosure, in the operation (operation 1650) of displaying a second screen 633*a* in the second display region 533, a second screen 633*a* for controlling a data executing function that can be performed in the external electronic device 601 may be displayed in the second display region 533.

According to various embodiments of the disclosure, in the operation (operation 1650) of displaying a second screen 633*a* in the second display region 533, data may be transmitted to the external electronic device 601 by using a function of the first application such that the external electronic device 601 performs the data executing function.

According to various embodiments of the disclosure, in the operation (operation 1650) of displaying a second screen 633*a* in the second display region 533, a second screen 633*a* for identifying a data acquiring function that can be performed in the external electronic device 601 may be displayed in the second display region 533.

According to various embodiments of the disclosure, in the operation (operation 1650) of displaying a second screen 633*a* in the second display region 533, in order to identify data acquired from the external electronic device 601, a second screen 633*a* related to a function of the first application may be displayed, based on the acquired data, in the second display region 533.

According to various embodiments of the disclosure, the method may include an operation (for example, operations 1955*a* and operation 1955*c* in FIG. 19) of identifying the type of an input received from the external electronic device 601, and an operation (for example, operation 1955*b* and operation 1955*d* in FIG. 19) of displaying, based on the type of the identified input, a second screen 633*a* on which a function corresponding to the identified type of the input in the second display region 533.

According to various embodiments of the disclosure, the method may include an operation (for example, operation 2057*a* in FIG. 20) of identifying, when connected to multiple external electronic devices 1401*a* and 1401*b* through the communication circuit 510, an external electronic device 1401*a* or 1401*b* that performs a function related to a function of the first application among the multiple external electronic devices 1401*a* and 1401*b*, and an operation (for example, operation 2057*b* in FIG. 20) of displaying a second screen 633*a* related to a function that can be performed in the identified external electronic device 1401*a* or 1401*b* and a function of the first application in the second display region 533.

According to various embodiments of the disclosure, the second screen 633*a* may be a screen resulting from execution of a second application related to a function of the first application and a function that can be performed in the external electronic device 601.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a communication circuit;
   a processor; and
   memory storing one or more programs including instructions which, when executed by the processor, cause the electronic device to:
      identify whether the electronic device is connected to an external electronic device through the communication circuit,
      identify whether an area of the display exposed to outside of the electronic device is a first size or a second size greater than the first size while a first screen is displayed in a first display region of the display based on execution of a first application, the first screen including content of the first application, and
      based on identifying that the area of the display exposed to the outside is changed from the first size to the second size while being connected to the external electronic device through the communication circuit, display, in a second display region expanded from the first display region, a second screen including content related to a function that can be performed by the external electronic device and a function of the first application while displaying the first screen in the first display region,
   wherein the content of the second screen related to the function that can be performed by the external electronic device being displayed in the second display region comprises content related to an additional function of the first application.

2. The electronic device of claim 1, wherein the one or more programs further include instructions which, when executed by the processor, cause the electronic device to:
   display, in the second display region, the second screen as a screen for controlling a data transmitting/receiving function that can be performed by the external electronic device.

3. The electronic device of claim 2, wherein the one or more programs further include instructions which, when executed by the processor, cause the electronic device to:
   transmit data to the external electronic device or receive data from the external electronic device by using the function of the first application such that the external electronic device performs the data transmitting/receiving function.

4. The electronic device of claim 1, wherein the one or more programs further include instructions which, when executed by the processor, cause the electronic device to:
   display, in the second display region, the second screen as a screen for controlling a data executing function that can be performed by the external electronic device.

5. The electronic device of claim 4, wherein the one or more programs further include instructions which, when executed by the processor, cause the electronic device to:
   transmit data to the external electronic device by using the function of the first application such that the external electronic device performs the data executing function.

6. The electronic device of claim 1, wherein the one or more programs further include instructions which, when executed by the processors, cause the electronic device to:
   display, in the second display region, the second screen as a screen for identifying a data acquiring function that can be performed by the external electronic device.

7. The electronic device of claim 6, wherein the one or more programs further include instructions which, when executed by the processor, cause the electronic device to:
   based on data acquired from the external electronic device, display, in the second display region, the second screen as a screen related to the function of the first application in order to identify the data acquired from the external electronic device.

8. The electronic device of claim 1, wherein the one or more programs further include instructions which, when executed by the processor, cause the electronic device to:
   identify a type of input received from the external electronic device, and
   based on the type of input, display, in the second display region, the second screen as a screen on which a function corresponding to the type of input is executed.

9. The electronic device of claim 1, wherein the one or more programs further include instructions which, when executed by the processor, cause the electronic device to:
   based on the electronic device being connected to multiple external electronic devices through the communication circuit, identify at least one external electronic device among the multiple external electronic devices that performs a function related to the function of the first application, and
   display, in the second display region, the second screen as a screen related to a function that can be performed by the at least one external electronic device and the function of the first application.

10. The electronic device of claim 1, wherein the second screen is a screen based on execution of a second application related to the function of the first application and the function that can be performed by the external electronic device.

11. A method comprising:
    identifying whether an electronic device is connected to an external electronic device through a communication circuit of the electronic device;
    while a first screen is displayed in a first display region of an expandable display of the electronic device based on execution of a first application, identifying whether an area of the expandable display exposed to outside of the electronic device is in a first size or a second size greater than the first size, the first screen including content of the first application; and based on identifying that the area of the expandable display exposed to the outside is changed from the first size to the second size while being connected to the external electronic device through the communication circuit, displaying, in a second display region expanded from the first display region, a second screen including content related to a function that can be performed by the external electronic device and a function of the first application while displaying the first screen in the first display region, wherein the content of the second screen related to the function that can be performed by the external electronic device being displayed in the second display region comprises content related to an additional function of the first application.

12. The method of claim 11, further comprising:

displaying, in the second display region, the second screen as a screen for controlling a data transmitting/receiving function that can be performed by the external electronic device.

13. The method of claim 12, further comprising:

transmitting data to the external electronic device or receiving data from the external electronic device by using the function of the first application such that the external electronic device performs the data transmitting/receiving function.

14. The method of claim 11, further comprising:

displaying, in the second display region, the second screen as a screen for controlling a data executing function that can be performed by the external electronic device.

15. The method of claim 14, further comprising:

transmitting data to the external electronic device by using the function of the first application such that the external electronic device performs the data executing function.

16. The electronic device of claim 1, wherein the content is determined based on data acquired from the external electronic device.

* * * * *